(12) United States Patent  (10) Patent No.: US 9,019,846 B2
Shaffer et al.  (45) Date of Patent: Apr. 28, 2015

(54) REDUCING THE IMPACT OF HIDDEN NODES IN MESH NETWORKS

(75) Inventors: Shmuel Shaffer, Palo Alto, CA (US); Charles Okwudiafor, Fremont, CA (US); Sandeep J. Shetty, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 402 days.

(21) Appl. No.: 13/164,731

(22) Filed: Jun. 20, 2011

(65) Prior Publication Data

US 2012/0320768 A1 Dec. 20, 2012

(51) Int. Cl.
 *H04L 12/26* (2006.01)
 *H04W 40/16* (2009.01)
 *H04L 12/727* (2013.01)
 *H04L 12/721* (2013.01)
 *H04L 12/717* (2013.01)
 *H04W 40/22* (2009.01)

(52) U.S. Cl.
 CPC ............. *H04W 40/16* (2013.01); *H04L 45/121* (2013.01); *H04L 45/124* (2013.01); *H04L 45/42* (2013.01); *H04W 40/22* (2013.01)

(58) Field of Classification Search
 USPC .......................................... 370/252; 455/501
 See application file for complete search history.

(56) References Cited

U.S. PATENT DOCUMENTS

| | | | |
|---|---|---|---|
| 7,031,266 B1 | 4/2006 | Patel et al. | |
| 7,068,624 B1 | 6/2006 | Dantu et al. | |
| 7,184,407 B1 | 2/2007 | Myles et al. | |
| 7,385,945 B1 | 6/2008 | Olson et al. | |
| 7,403,501 B2 | 7/2008 | Bordonaro et al. | |
| 7,421,248 B1 | 9/2008 | Laux et al. | |
| 7,424,268 B2 | 9/2008 | Diener et al. | |
| 7,529,303 B1 | 5/2009 | Schwartzman et al. | |
| 7,539,169 B1 | 5/2009 | O'Hara, Jr. et al. | |
| 7,616,555 B2 | 11/2009 | Hart | |
| 7,620,000 B2 | 11/2009 | Meier | |
| 7,626,969 B2 | 12/2009 | Hart et al. | |
| 7,756,542 B1 | 7/2010 | Kaiser et al. | |

(Continued)

OTHER PUBLICATIONS

Winter et al., "IPv6 Routing Protocol for Low Power and Lossy Networks" <draft-ietf-roll-rpl-19> Mar. 13, 2001 version, pp. 1-85.

(Continued)

*Primary Examiner* — Afshawn Towfighi
(74) *Attorney, Agent, or Firm* — Parker Ibrahim & Berg LLC; James M. Behmke; Stephen D. LeBarron

(57) ABSTRACT

In one embodiment, hidden neighbor relationships are identified based on received neighbor information from a plurality of nodes in a communication network. Based on determining a number of hidden neighbors for a particular node at various node parameters, a cost function associated with the particular node may be determined and utilized. In another embodiment, a number of hidden nodes of the particular node is determined across a range of transmission powers, and a delay associated with the particular node reaching a root node in the network across the range of transmission powers is also determined based on the neighbor nodes reachable at respective transmission powers. A tradeoff is determined across the range of transmission powers between the number of hidden nodes and the delay, and then the transmission power of the particular node can be set based on an acceptable determined tradeoff.

23 Claims, 19 Drawing Sheets

(56) References Cited

U.S. PATENT DOCUMENTS

| | | |
|---|---|---|
| 7,787,897 B2 | 8/2010 | Banh et al. |
| 7,801,096 B2 | 9/2010 | Myles et al. |
| 7,801,546 B2 | 9/2010 | Yang et al. |
| 7,821,956 B2 | 10/2010 | Retana et al. |
| 7,826,463 B2 | 11/2010 | Patel et al. |
| 7,869,412 B2 | 1/2011 | Meier |
| 7,872,997 B2 | 1/2011 | Qian |
| 7,925,268 B2 | 4/2011 | Sanders et al. |
| 7,944,823 B1 | 5/2011 | Bordonaro et al. |
| 2005/0163095 A1 | 7/2005 | Raleigh et al. |
| 2006/0046739 A1 | 3/2006 | Blosco et al. |
| 2007/0036091 A1* | 2/2007 | Kuan et al. .................... 370/254 |
| 2008/0232258 A1* | 9/2008 | Larsson et al. ................ 370/238 |
| 2009/0168712 A1 | 7/2009 | Douglas et al. |
| 2011/0075578 A1 | 3/2011 | Kim et al. |
| 2012/0170486 A1* | 7/2012 | Mohapatra et al. ........... 370/254 |

OTHER PUBLICATIONS

Vasseur et al., "Routing Metrics used for Path Calculation in Low Power and Lossy Networks," <draft-ietf-roll-routing-metrics-19> Mar. 1, 2011 version, pp. 1-30.

Thubert P., "RPL Objective Function 0" <draft-ietf-roll-of0-11> May 5, 2011 version, pp. 1-11.

Gnawali et al., "The Minimum Rank Objective Function with Hysteresis" <draft-ietf-roll-minrank-hysteresis-of-03> May 3, 2011 version, pp. 1-10.

Cipolla, et al., "Notification of Transmittal of the International Search Report and the Written Opinion of the International Searching Authority, or the Declaration", Patent Cooperation Treaty, Oct. 23, 2012, 13 pages, PCT/US2012/043264, European Patent Office, Rijswijk, Netherlands.

Srivastava, et al., "Distributed Range Assignment for Reliable Channel Access and Reuse in Ad-Hoc Neteworks", 2004 International Conference on Signal Processing & Communications (SPCOM), Dec. 2004, pp. 159-163, IEEE, Piscataway, New Jersey.

* cited by examiner

REDUCING THE IMPACT OF HIDDEN NODES IN MESH NETWORKS

TECHNICAL FIELD

The present disclosure relates generally to wireless communication, and, more particularly, to collision avoidance in mesh networks such as sensor networks.

BACKGROUND

Wireless mesh systems conventionally do not commonly employ the known Carrier Sense Media Access Control/Collision Avoidance (CSMA/CA) protocol because it cannot prevent collision of packets from "hidden nodes". For example, assume that a first node "A" and a second node "C" are each within wireless range of a third node "B", but nodes A and C are out of wireless range from each other. Since nodes A and C cannot hear each other, in the event both nodes attempt to send a wireless signal/packet to node B at the same time, the signals would collide and corrupt each other, rendering the received signal at node B incomprehensible. Because nodes A and C cannot hear each other, adding the current CSMA/CA protocol to the nodes would not have resolved the collision issue, as nodes A and C each had no indication of transmission by the other node. In other words, even if all nodes are equipped with carrier sensing capabilities, which would allow them to sense if another node is transmitting, this carrier sensing cannot help avert collisions of packets from hidden nodes such as A and C (hidden to each other).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
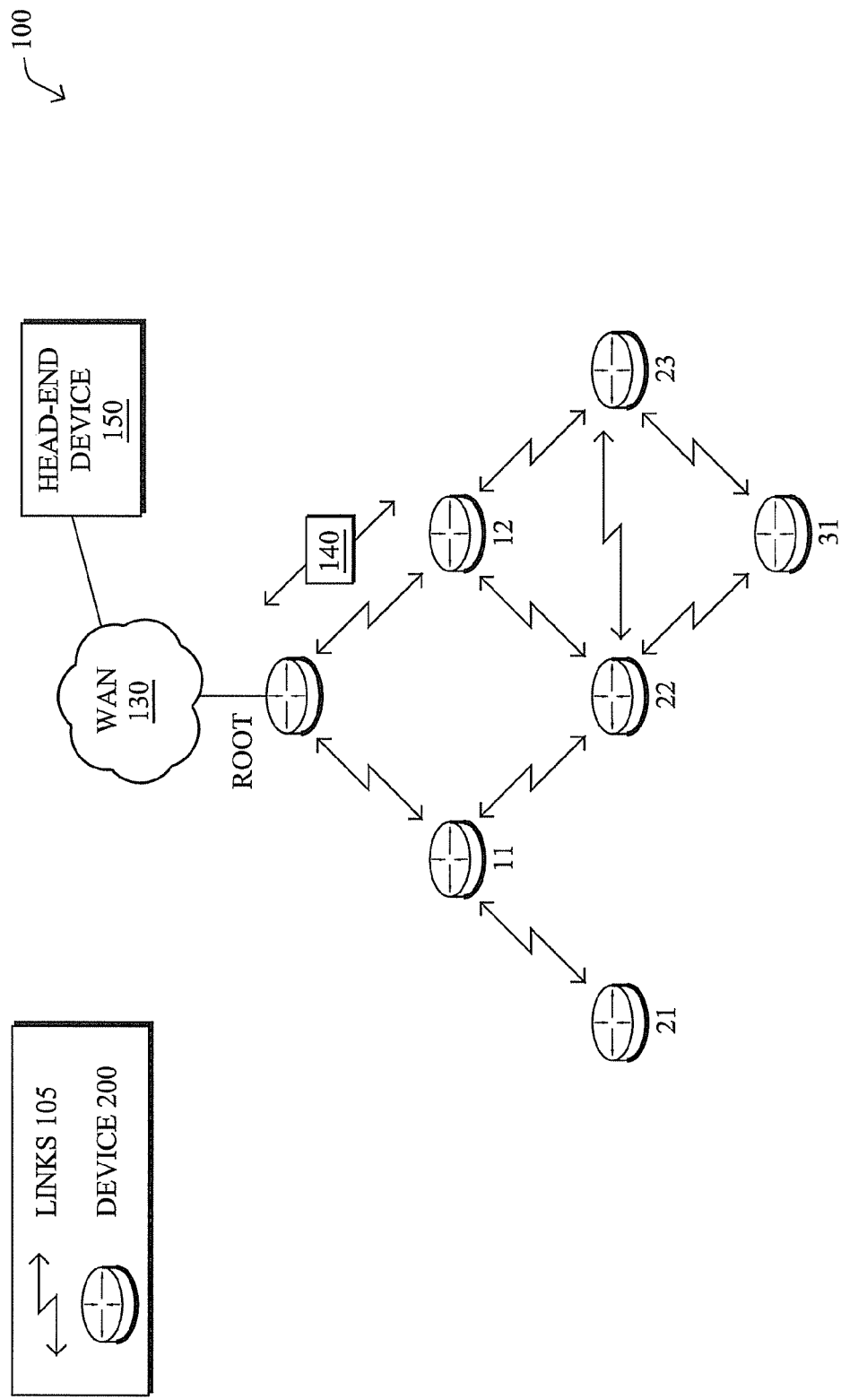
FIG. 1 illustrates an example computer network.

According to one or more embodiments of the disclosure, hidden neighbor relationships are identified based on received neighbor information from a plurality of nodes in a wireless communication network. Based on determining a number of hidden neighbors for a particular node at various node parameters, a cost function associated with the particular node may be determined (e.g., route cost and/or node parameters, such as transmission power, channel, and sensitivity). Accordingly, routing functions may then operate in the computer network based on the adjusted cost function.

According to one or more additional embodiments of the disclosure, a number of hidden nodes of a particular node is determined across a range of transmission powers in a computer network, where the hidden nodes are able to wirelessly reach neighbor nodes of the particular node and the particular node is able to wirelessly reach the neighbor nodes but not the hidden nodes at the respective transmission power. In addition, a delay associated with the particular node reaching a root node in the computer network across the range of transmission powers is also determined based on the neighbor nodes wirelessly reachable at respective transmission powers. As such, a tradeoff is determined across the range of transmission powers between the number of hidden nodes of the particular node and the delay associated with the particular node reaching the root node, and then the transmission power of the particular node can be set based on an acceptable determined tradeoff.

Description

A network is a geographically distributed collection of nodes interconnected by communication links and segments for transporting data between end nodes, such as personal computers and workstations, or other devices, such as radios, sensors, etc. Many types of computer networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others.

A wireless network, in particular, is a type of network where a plurality of nodes communicate over a wireless medium, such as using radio frequency (RF) transmission through the air. For example, a Mobile Ad-Hoc Network (MANET) is a kind of wireless ad-hoc network, which is generally considered a self-configuring network of mobile routes (and associated hosts) connected by wireless links, the union of which forms an arbitrary topology. For instance, Low power and Lossy Networks (LLNs), e.g., certain sensor networks, may be used in a myriad of applications such as for "Smart Grid" and "Smart Cities," and may often consist of wireless nodes in communication within a field area network (FAN). LLNs are generally considered a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

FIG. 1 is a schematic block diagram of an example network 100 (e.g., computer network, communication network, etc.) illustratively comprising nodes/devices, 11, 12, 21, 22, 23, 31, and "ROOT", interconnected by wireless communication (links 105). In particular, certain nodes, such as, e.g., routers, sensors, computers, radios, etc., may be in wireless communication with other nodes, e.g., based on distance, signal strength, current operational status, location, etc. In addition, the root node may be interconnected to a head-end device 150 through a WAN (or other type of network 130.

Those skilled in the art will understand that any number of nodes, devices, links, etc. may be used in the wireless network, and that the view shown herein is for simplicity (particularly, that while routers are shown, any wireless communication devices 11-31 may be utilized). Also, while the embodiments are shown herein with reference to a primarily wireless network, the description herein is not so limited, and may be applied to networks that have wired and wireless links. Further, while the embodiments are shown herein with reference to a generally "tree" shaped network, the description herein is not so limited, and may be applied to any type of suitable networks, such as those that have branches emitting to all directions with the root node generally centralized among a plurality of surrounding nodes.

Data packets 140 (e.g., traffic and/or messages sent between the devices/nodes) may be exchanged among the nodes/devices of the computer network 100 using predefined network communication protocols such as certain known wireless protocols (e.g., IEEE Std. 802.15.4, WiFi, Bluetooth®, etc.). In this context, a protocol consists of a set of rules defining how the nodes interact with each other.

Figure 2:
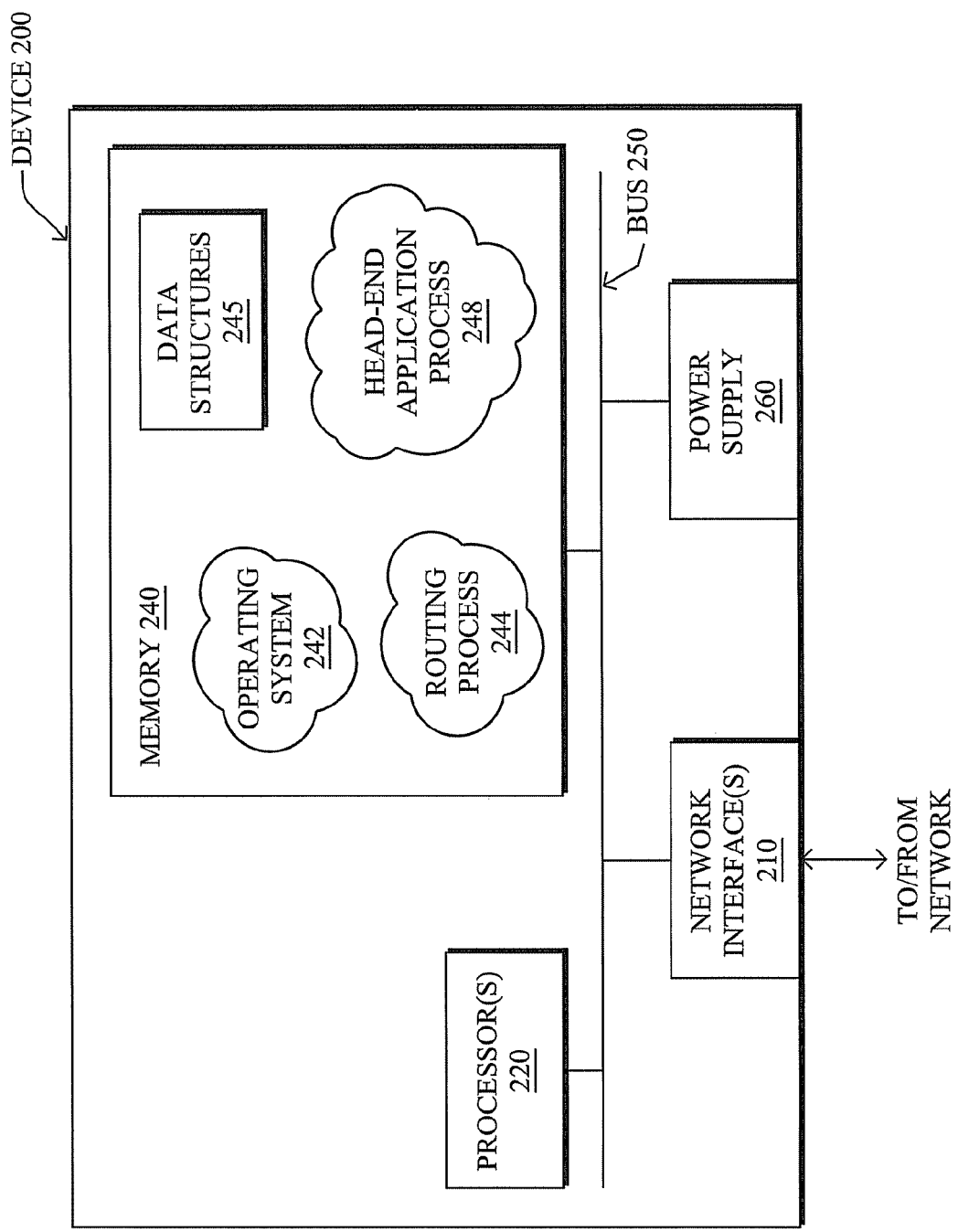
FIG. 2 illustrates an example device/node.

FIG. 2 is a schematic block diagram of an example node/device 200 that may be used with one or more embodiments described herein, e.g., as any of the nodes/devices in FIG. 1, particularly including the head-end device 150 and root node. The device may comprise one or more network interfaces 210 (e.g., wireless), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over wireless links coupled to the network 100. The network interfaces may be configured to transmit and/or receive data using a variety of different communication protocols as noted above and as will be understood by those skilled in the art. Note, further, that the nodes may have two different types of network connections 210, namely, wireless and wired/physical connections, and that the view herein is merely for illustration. In particular, the root node and/or head-end device 150 may be configured with wired network interfaces to the WAN 130, while the root node and nodes 11-31 may be configured with wireless interfaces to intercommunicate.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245 (notably on capable devices only). An operating system 242, portions of which are typically resident in memory 240 and executed by the processor, functionally organizes the device by, inter alia, invoking operations in support of software processes and/or services executing on the device. These software processes and/or services may comprise routing process/services 244, and, for at least the root node and/or head-end device 150, a head-end application 248 for use as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks" <draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built based on an Objective Function (OF). The role of the Objective Function is generally to specify rules on how to build the DAG (e.g. number of parents, backup parents, etc.). One example of an OF is a reduction of a cost function (CF) as described in greater details below.

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" or "removed" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG' s primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks" <draft-ietf-roll-routing-metrics-19> by Vasseur, et al. (Mar. 1, 2011 version). Further, an example OF (e.g., a default OF) may be found in an IETF Internet Draft, entitled "RPL Objective Function 0" <draft-ietf-roll-of0-11> by Thubert (May 5, 2011 version) and "The Minimum Rank Objective Function with Hysteresis" <draft-ietf-roll-minrank-hysteresis-of-03> by O. Gnawali et al. (May 3, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
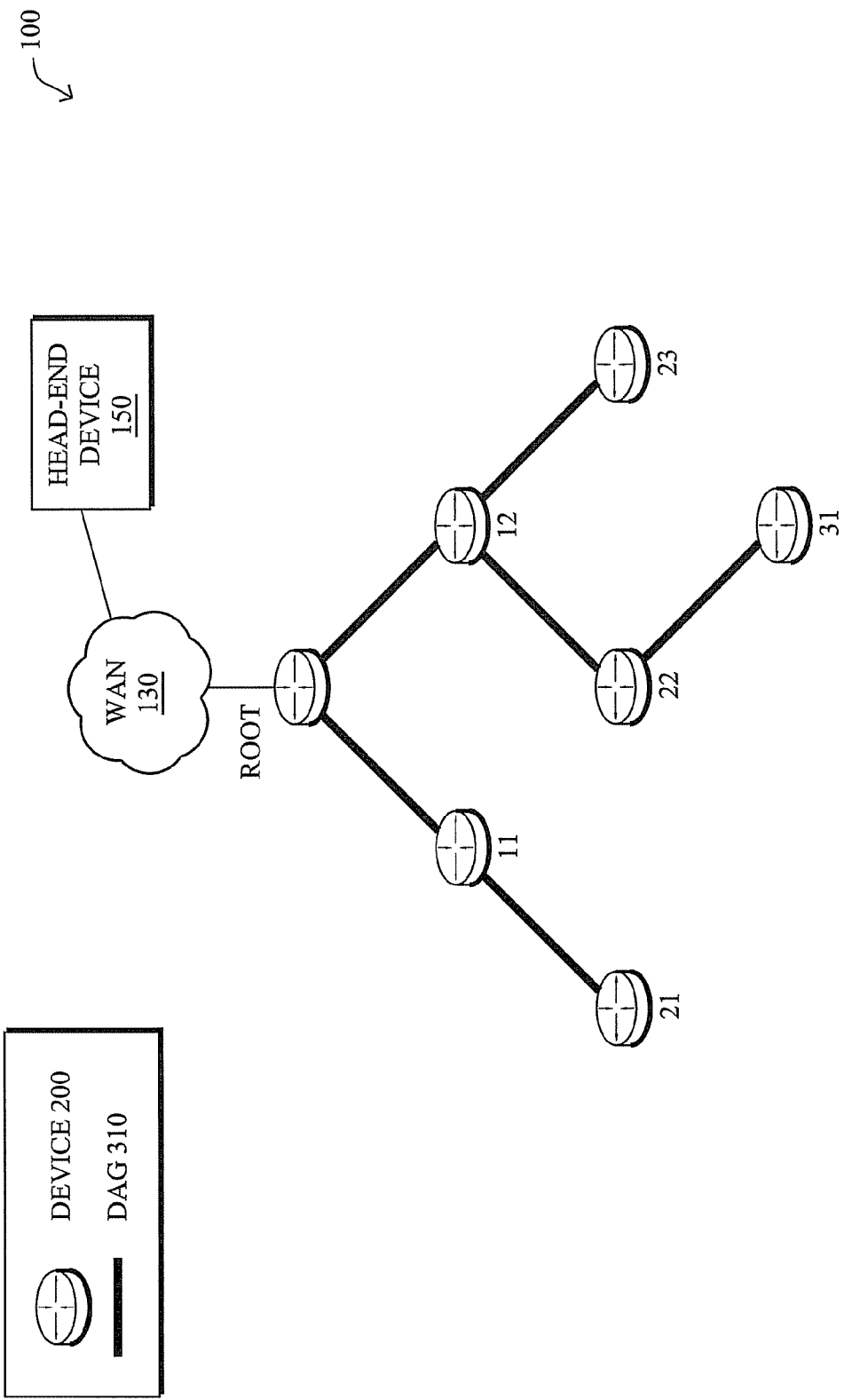
FIG. 3 illustrates an example directed acyclic graph (DAG) in the computer network of FIG. 1.

FIG. 3 illustrates an example simplified DAG 310 that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extend from a root node (e.g., a gateway, ingress/egress router, etc.) toward one or more leaf nodes (nodes without children). Traffic/packets 140 (shown in FIG. 1) may then traverse the DAG 310 in either the upward direction toward the root or downward toward the leaf nodes, particularly as described herein. Again, as mentioned above, while the embodiments are shown herein with reference to a generally "tree" shaped network, the description herein is not so limited, and may be applied to networks that have branches emitting to all directions from with the root node generally centralized among a plurality of surrounding nodes.

As noted above, wireless systems conventionally do not employ the known Carrier Sense Media Access Control/Collision Avoidance (CSMA/CA) protocol because it cannot prevent collision of packets from "hidden nodes". In particular, CSMA is a probabilistic Media Access Control (MAC) protocol in which a node verifies the absence of other traffic before transmitting on a shared transmission medium (e.g., a particular RF band) based on detecting a carrier wave from another node on the medium. In particular, CSMA/CA is a known wireless network multiple access method which uses carrier sensing, where a node wishing to transmit data has to first listen to the channel for a predetermined amount of time to determine whether or not another node is transmitting on the channel within the wireless range. If the channel is sensed "idle," then the node is permitted to begin the transmission process. If the channel is sensed as "busy," then the node defers its transmission for a period of time (e.g., random).

Figure 4:
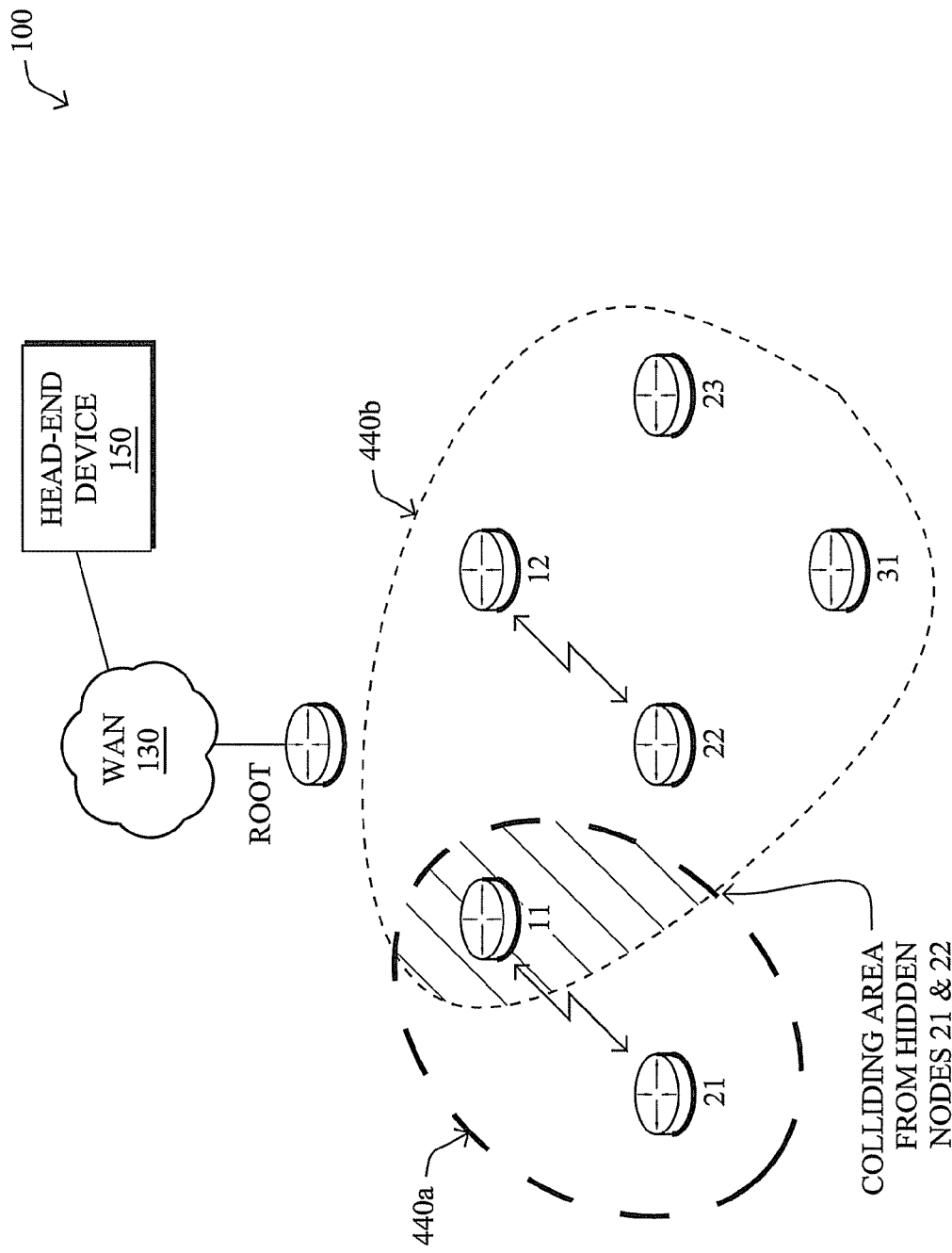
FIG. 4 illustrates an example wireless collision due to hidden nodes.

One issue with CSMA/CA may be illustrated with reference to FIG. 4. In particular, assume that a first node 21 and a second node 22 of the network 100 are each within wireless range of a third node 11, but nodes 21 and 22 are out of wireless range from each other. Since nodes 21 and 22 cannot hear each other, in the event both nodes attempt to send a wireless signal/packet 140 (radio signals 440a and 440b) to node 11 at the same time, the radio signals would collide and corrupt each other, rendering the received signal at node 11 incomprehensible. Because nodes 21 and 22 cannot hear each other, the CSMA/CA protocol would not have resolved the collision issue, as nodes 21 and 22 each had no indication of transmission by the other node (i.e., nodes 21 and 22 are hidden to each other).

Optionally, a permission-based communication protocol may be used to better handle situations such as the hidden node problem mentioned above. For example, a "Request to Send/Clear to Send" (RTS/CTS) exchange, such as the IEEE Std. 802.11 RTS/CTS exchange, can be utilized to reduce frame collisions introduced by hidden nodes. According to a conventional RTS/CTS exchange, a node wishing to send data initiates the process by sending an RTS frame, and the destination node replies with a CTS frame. Any other node receiving the RTS or CTS frame should refrain from sending data for a given time, thus alleviating the hidden node problem (note that the amount of time the node should wait before trying to get access to the medium is included in both the RTS and the CTS frame). Accordingly, RTS/CTS is one manner to implement a "virtual" carrier sensing mechanism for CSMA/CA.

Typically, sending RTS/CTS frames does not occur unless the packet size exceeds some threshold (e.g., over 2347 octets in length). That is, if the packet size the node wants to transmit is larger than the threshold, the RTS/CTS handshake is triggered, otherwise, the data frame may be sent immediately. As such, RTS/CTS is not always suitable for all types of networks, particular those with smaller packet sizes. For instance, the RTS/CTS exchange adds overhead to the data transmission in the network, e.g., the RTS and CTS frames themselves, as well as the delay in transmitting the data until the RTS/CTS exchange is completed. Also, the RTS/CTS model assumes that nodes request permission to send their packet, which may not be the case in all network configurations. For example, a node (e.g., 21) may simply begin transmitting a packet to another node (e.g., 11) without permission (that is, without explicit permission (e.g., CTS) to transmit that particular packet: nodes 21 and 11 generally have permission to communicate with each other). Moreover, for various reasons, a CTS may not be received by all pertinent nodes, such as due to intermittent node communication, LLN behavior generally, other collisions during the CTS (e.g., from other directions), etc. As such, these nodes may send RTS frames (e.g., continuously) to a node that is already receiving a transmission, and this RTS frame would collide with the current transmission, rendering it incomprehensible, adversely disrupting the current transmission.

Other techniques, such as Synchronous Collision Resolution, H-NAME (Hidden Node Avoidance MEchanism), etc., have also been developed in order to reduce collisions and mitigate the hidden node problem. However, each of the existing solutions has their own strengths and suffers from their own shortcomings.

Reducing the Impact of Hidden Nodes in Mesh Networks

The techniques described herein reduce the impact of hidden nodes in wireless networks by accounting for hidden nodes wireless parameter selection and routing decisions. For instance, as described in detail below, each node may discover their neighboring nodes (e.g., using maximum radio transmission power), and communicates the neighbor information to a central coordinator (e.g., root node or head-end device). The central coordinator may then optimize node parameters (e.g., transmission strength, channels, receiver sensitivity, etc.) and/or and routing decisions (e.g., routing costs) by taking into account the number of hidden nodes, also based on the tradeoff between the number of hidden nodes and communication delay. Accordingly, the techniques herein alleviate the hidden node issue as well as reduce collisions associated with contention based protocols in wireless mesh networks. In particular, these techniques are particularly beneficial in a Smart Grid AMI network where the placement of nodes (meters, relays, routers) is fixed but not necessarily optimally located.

Illustratively, certain techniques described herein may be performed by hardware, software, and/or firmware, such as in accordance with head-end application process 248, which may contain computer executable instructions executed by the processor 220 to perform functions relating to the novel techniques described herein, such as within a head-end device 150 and/or root node. For example, the techniques herein may be treated as extensions to conventional wireless communication protocols, such as the 802.11 protocol, WiFi, etc., and as such, would be processed by similar components understood in the art that execute such protocols, accordingly. Note also that where certain node parameters are adjusted as described herein, such adjustments may be made by corresponding processes/applications within memory 240 and/or within network interfaces 210, as will be appreciated by those skilled in the art.

Operationally, the techniques herein introduce two new, non-exclusive, algorithms to mitigate the hidden neighbor issue. The first algorithm introduces a new cost function that is used for optimizing route selection to minimize interference from hidden neighbors. The cost function is derived based on the number of hidden nodes associated with a given node at a given (and selected) transmission power, channel, and receiver sensitivity. The second algorithm optimizes the transmission power and/or receiver sensitivity of nodes in the mesh in order to minimize the number of hidden neighbors while attempting to have a minimal impact on the overall delay through the network.

Figure 5:
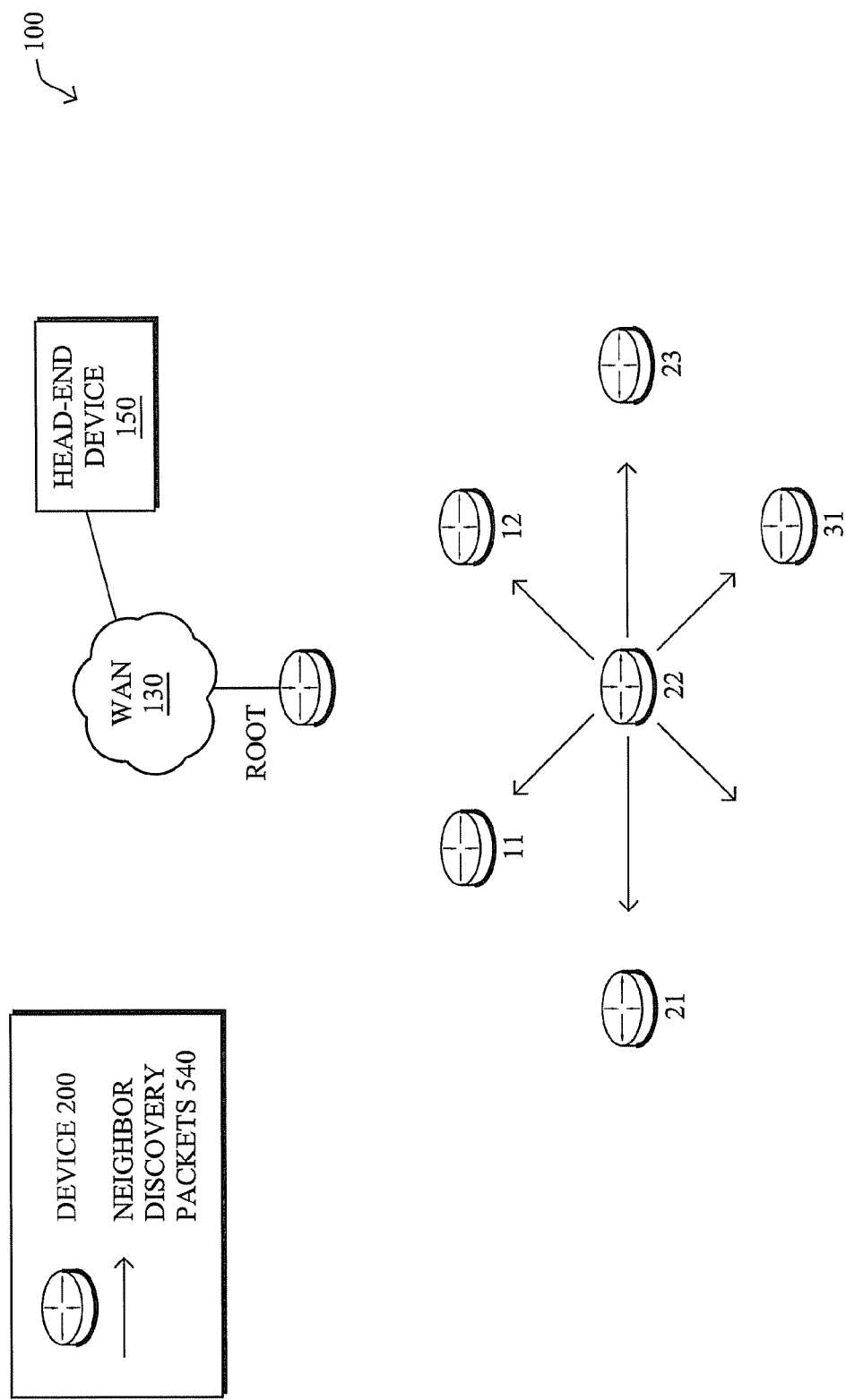
FIG. 5 illustrates an example passing of neighbor discovery messages.

According to the illustratively first algorithm, wireless, i.e., radio frequency (RF), parameters may be elected based on hidden neighbors in the following manner. First, based on existing protocols, the head-end applications 248 of the root node or head-end device 150 may receiving neighbor information from a plurality of nodes in a wireless communication network 100. In particular, each node in the network may send neighbor discovery packets (NDP) 540 into the network, as shown (as a simplistic representation of node 22's perspective only) in FIG. 5. Generally, the details of the neighbor discovery process may be based on well-known techniques, and it is assumed that each node can obtain (explicitly or implicitly) the following parameters from its neighbors (using NDP or by other means):

i. A unique identity of the transmitting node;
ii. The transmit power, Tx, at which the neighbor packet was transmitted (it can be assumed that in a specific illustrative embodiment the transmitting node will use the maximum Tx power which it is capable and allowed to employ when transmitting the NDP);
iii. The received signal strength of the neighbor packet receiver can be accurately characterized;
iv. The channel on which the packet was received;
v. An indication of its transmit, receive, and overall channel utilization;
vi. The receiver sensitivity at which the neighbor packet was received (it can be assumed that in a specific illustrative embodiment that the receiving node will use the maximum receiver sensitivity of which it is capable and allowed to employ when receiving the NDP); and
vii. Identity of all prospective parent and children nodes.

Figure 6:
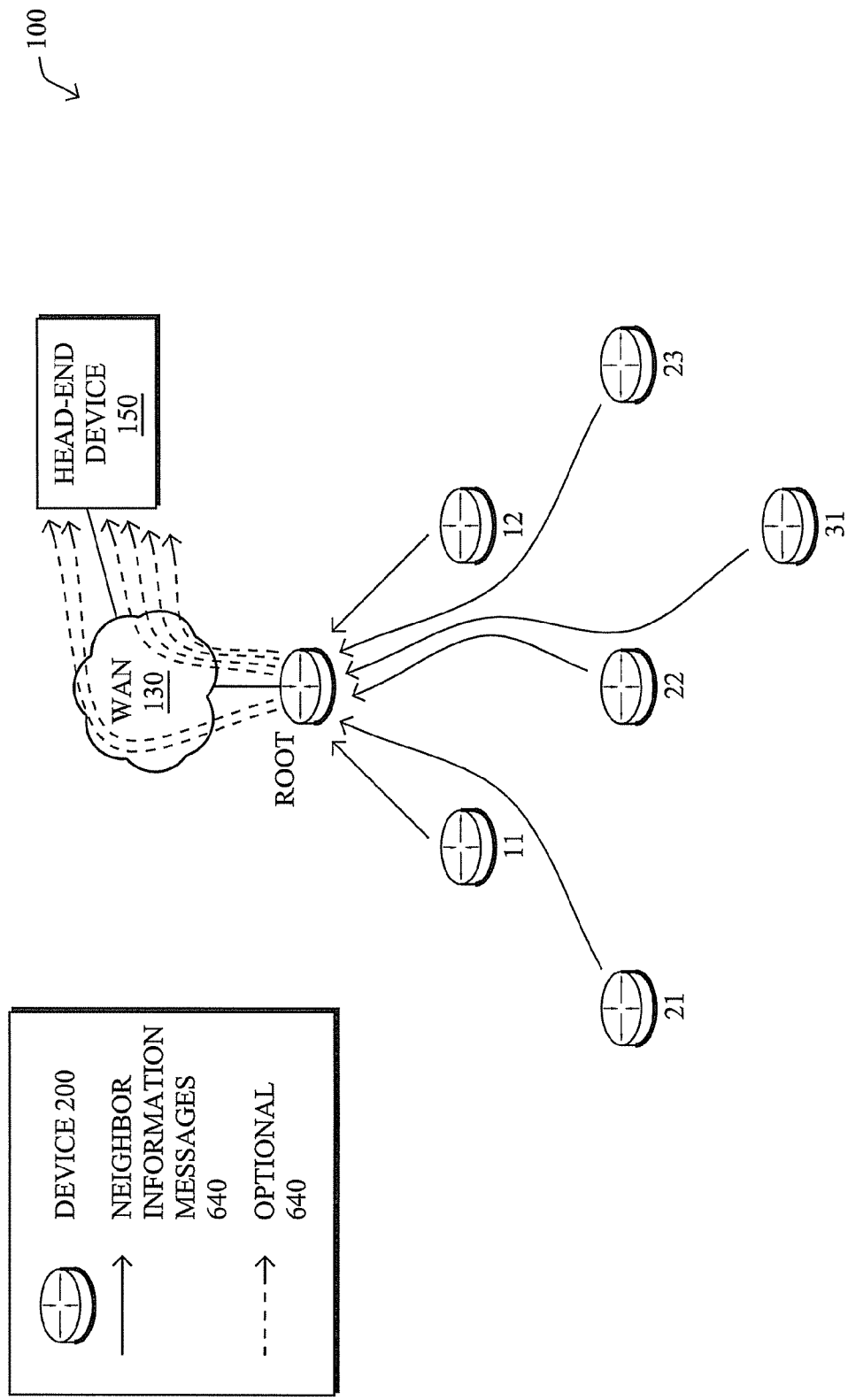
FIG. 6 illustrates an example passing of neighbor information.

The neighbor information may then be forwarded by each node to the root node of the mesh or to the central controller that collects the neighbor's data from all nodes in the mesh (e.g., the root node or the head-end device 150). FIG. 6 illustrates an example of messages 640 that may be sent to the root node or head-end device carrying the neighbor information. Note that the system herein adapts to link quality changes or other topology/parameter changes in time since it relies on readily available and continuously updated neighbor information (e.g., neighborhood tables).

Based on this information, the head-end application 248 (e.g., on a radio resource management entity) may calculate the path loss between nodes and determine which neighbors are hidden (e.g. neighbors of a node which cannot see each other). In other words, hidden neighbor relationships within the communication network may be identified based on the neighbor information. Though the description above is done with reference to the head-end determining the hidden neighbor relationships, those skilled in the art will recognize that this calculation may be carried out in the node 22 itself or in combination/collaboration between the various nodes, the root, or the head end. Illustratively, such as shown in FIG. 4 above, assume that the hidden neighbor relationship between nodes 21 and 22 is identified at node 11. (Again, the view shown herein is vastly simplistic, and is shown for illustration only; real-world networks may have thousands or millions of nodes, resulting in many more hidden neighbors, accordingly.)

In conventional systems, a "cost function" is developed to optimize the overall capacity of the system at a given level of coverage, as will be understood by those skilled in the art. The term "level of coverage" in this context means the effective power level required to achieve a desired signal-to-noise (interference) ratio. For a CSMA system, the choice of the cost function depends on the capabilities of the radios in the system. Generally, a cost function is constructed with the goal of optimizing the following parameters for each node:

a. Uplink and downlink Tx power with respect to its potential children and parents;
b. Channel of the node (note: based on the architecture this might be the channel of the entire network to which the node belongs, the channel of parents or children, or its own channel); and
c. Receiver sensitivity (i.e., based on the level of interference the signal detection at the receiver can be modified to ignore signals above a given threshold).

According to the embodiments herein, however, an optimization utilizes the parameters collected and calculated in the previous steps but introduces a new cost function that is used for optimizing route selection that is derived specifically based on the number of hidden nodes associated with a given node at a given Tx power, channel, and sensitivity. In particular, by first determining a number of hidden neighbors for a particular node of the plurality of nodes at various node parameters, the techniques herein may correspondingly determine a cost function associated with the particular node that is based on the number of hidden neighbors for the particular node.

For example, for the vector of parameters "p":

$$p = (\text{channel}[k], \text{power\_up}[l], \text{power\_dn}[m], \text{sensitivity}[n]),$$

Where:
k is an index in the set {channel_1, channel_2, ... channel_k, ..., channel_K};
l and m are indices in the set {power_1, power_2, ... power_1, ..., power_m, ..., power_L}; and
n is an index in the set {sensitivity_1, sensitivity_2, sensitivity_n, ..., sensitivity_N}"]

The enhanced cost function for node "i" and plan "j" (where plan j is a given set of node parameters defining the set of parameters of each node) can be represented as:

$$C_{ij}(p)^* = C_{ij}(P) + W_{hidden} \times H_{ij}(p),$$

Where:
$C_{ij}(p)^*$—enhanced cost function for node i for plan j;
$C_{ij}$—cost function for node i for plan j;
$H_{ij}$—number of hidden nodes for node i for plan j; and
$W_{hidden}$—user defined weight on the number of hidden nodes.

Accordingly, a set of node parameters may be selected based on the number of hidden nodes $H_{ij}$ (e.g., weighted) of the particular node to minimize interference between hidden neighbors.

In addition, when determining the cost routes to a given node at the particular node parameters, the route cost of the hidden node, $W_{hidden} \times H_{ij}(p)$, may be added to the general cost of routing, $C_{ij}(p)$. (Note, a cost can be associated with the number of competing nodes at the required power level.) Using this above-mentioned cost function, the algorithm selects an appropriate set of parameters p, as illustrated above, in order to reduce the enhanced cost associated with the hidden nodes. Consequently, the selection of the set of parameters affects/determines a new optimal routing path as to minimize interference among hidden neighbors. This minimizes the number of collisions in the network and as such increases the throughput and reduces the average delay through the network. Notably, the techniques herein mainly reduce the delay associated with retransmission of packets due to packet collisions. The overall delay may actually increase in some specific scenarios as the number of hops in a specific route may increase due to reduced transmission power or decreased receiver sensitivity.

Note further that a subset of particular nodes within the computer network may be selected for which a cost function is based on the number of hidden neighbors. That is, certain nodes may utilize conventional cost functions, while certain other nodes, e.g., those in congested areas, those with higher number of hidden nodes, etc., may be specifically selected to participate in the new cost function algorithm described herein.

Figure 7:
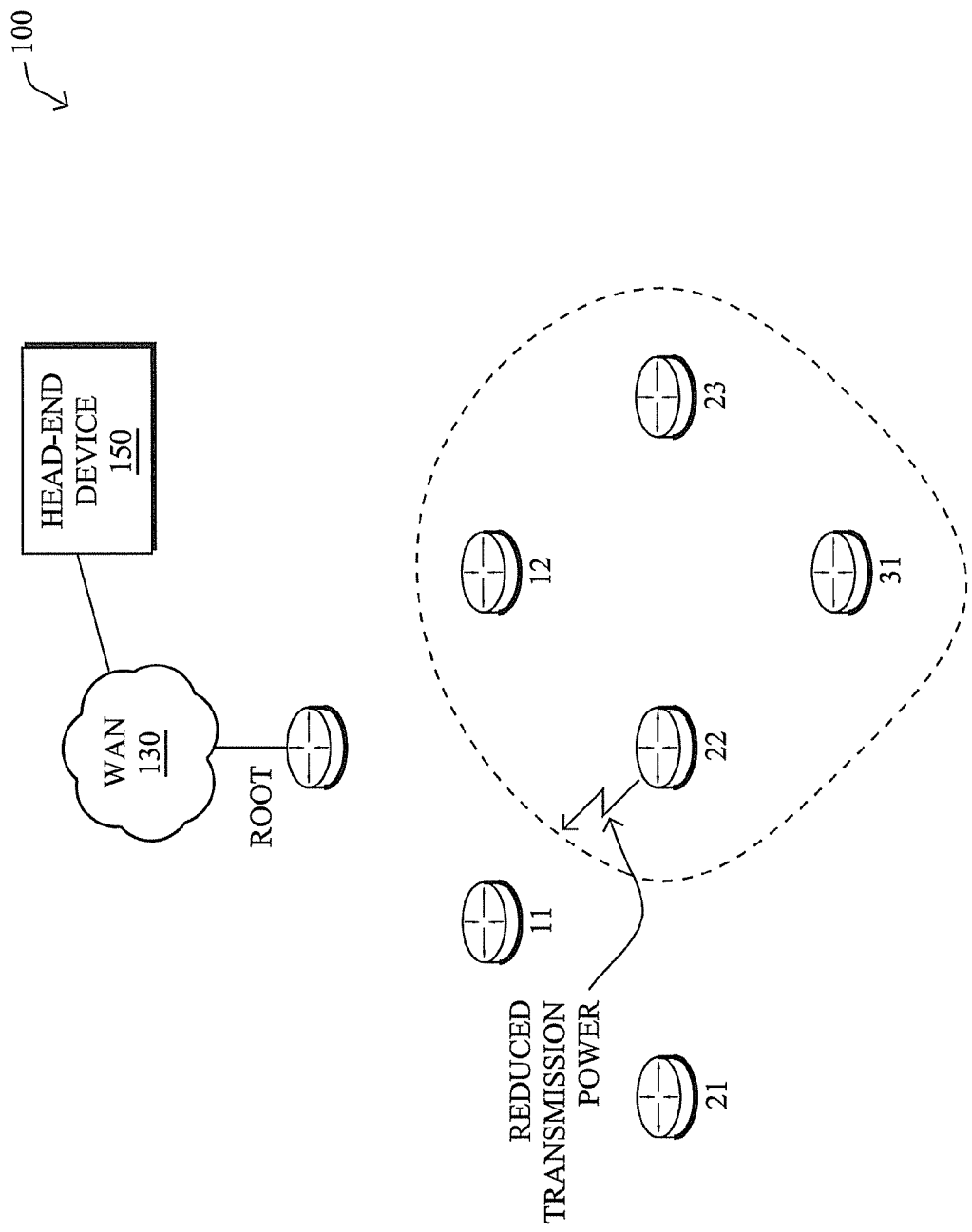
FIG. 7 illustrates an example of reduced transmission power.

FIGS. 7-10C illustrate examples of how the cost function may be selected and/or adjusted to reduce the impact of hidden nodes according to the techniques herein. For instance, FIG. 7 illustrates how a reduction in the transmission power Tx at node 22 results in no longer interfering with node 21's communication to node 11 (since node 11 can no longer hear node 22). Accordingly, system capacity increased and latency may be reduced (i.e., from not having to retransmit lost packets), however, the strength of the links to other nodes (e.g., nodes 23 and 31) is reduced. As such, the cost function selection algorithm should balance the reduction of power and the capacity of links. (Note also that node 22 may end up no longer communicating with node 12, a situation addressed in the second embodiment described below, e.g., with reference to FIGS. 11A-B.)

Figure 8:
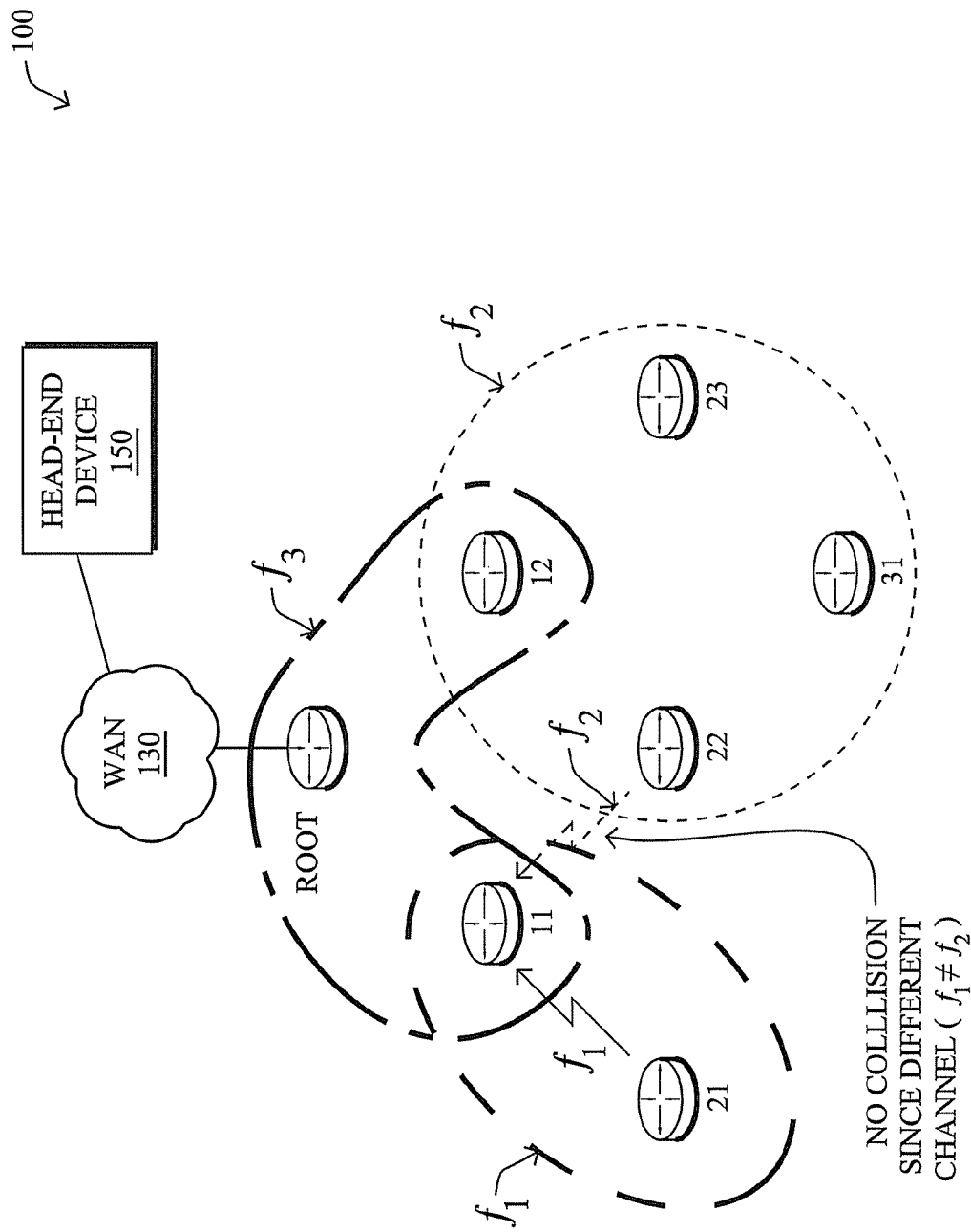
FIG. 8 illustrates an example of channel groups.

With reference to FIG. 8, an alternative or additional adjustment within the cost function's node parameters is to configure the nodes of the network 100 to communicate on different channels. For instance, while each node may be configured on a different channel, as shown in FIG. 8 a set of channel "groups" may be configured, where each node within a particular group is configured to communicate on the same channel as the other nodes in the same group. In this instance, nodes 21 and 22 are communicating on different channels, such that if node 22 communicates to node 12 on channel "$f_2$," then node 21's communication to node 11 on channel "$f_1$" will not result in a collision. Note that when nodes are communicating across groups, the respective channels need to be used, and collisions between hidden neighbors may still occur. However, the chosen selection of channel groups may be such that the number of occurrences is reduced. Note also that while single channels are described, the techniques are equally applicable to frequencies, frequency/channel hopping sequences, etc. Also, if a link 105 can be divided into timeslots, then uplink and downlink hidden nodes can be reduced further for nodes between the hops (though at the price of increased latency).

Figure 9:
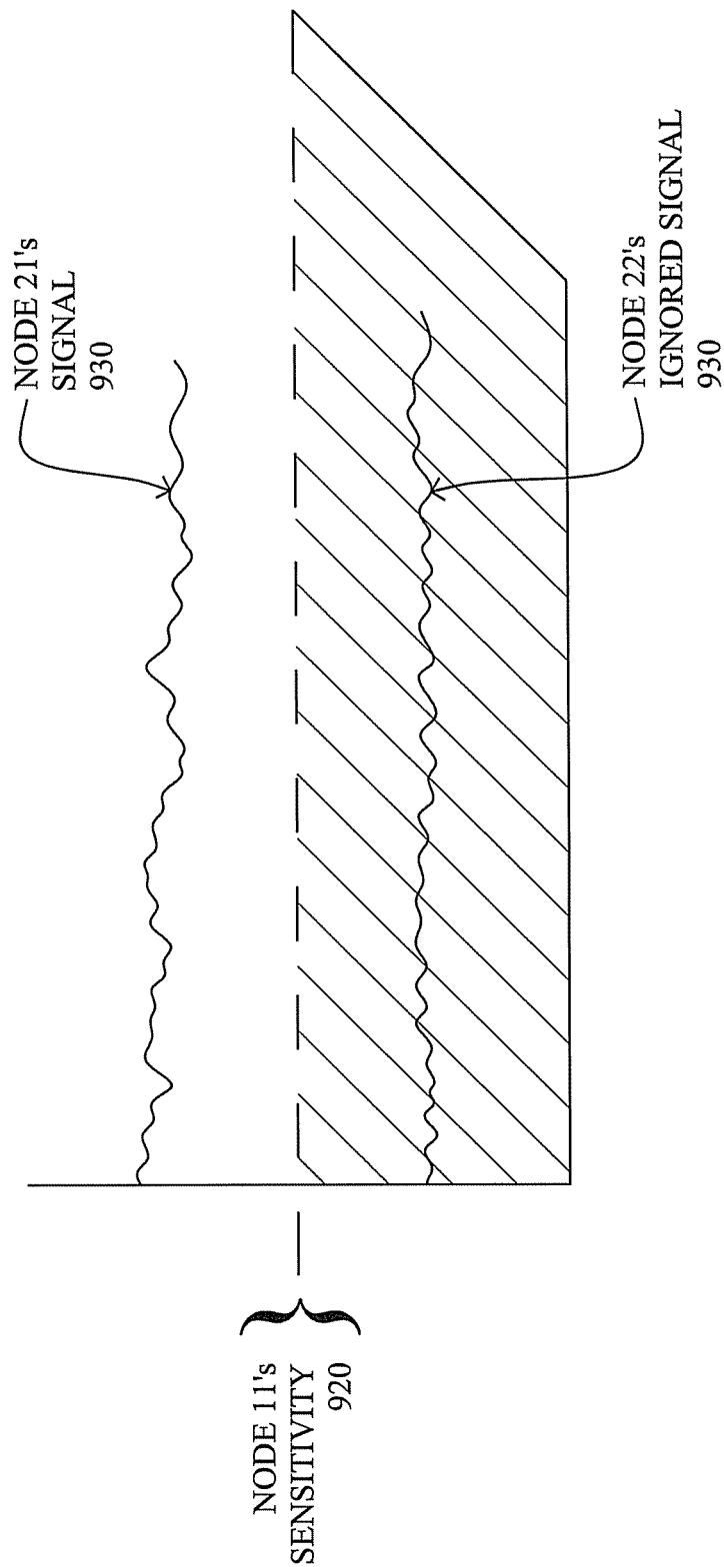
FIG. 9 illustrates an example of increased sensitivity.

FIG. 9 illustrates an example of increased sensitivity, where receiver sensitivity at node 11 is changed to filter out weaker signals. For instance, a packet from node 21 with signal 910 may be above the sensitivity level 920 of node 11, while a packet from node 22 with signal 930 may end up below the sensitivity level 920 of node 11. As such, though node 11 may still "hear" both signals 910 and 930 from nodes 21 and 22, respectively, node 11 may essentially "ignore" the signal from node 22 and successfully decode the message from node 21.

Figure 10A:
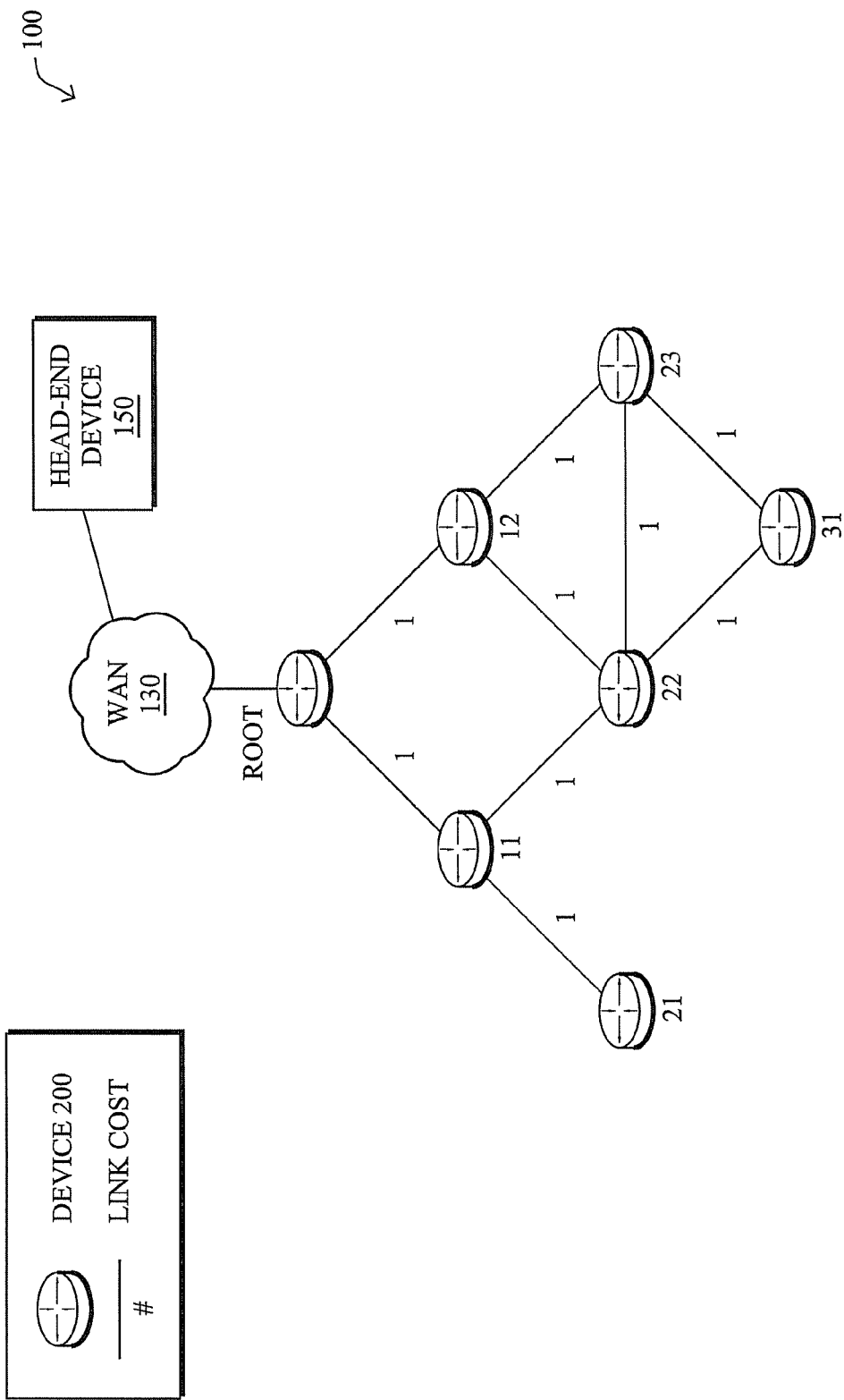
FIGS. 10A-10C illustrates an example of routing costs and an updated DAG based on adjusted routing costs.
Figure 10B:
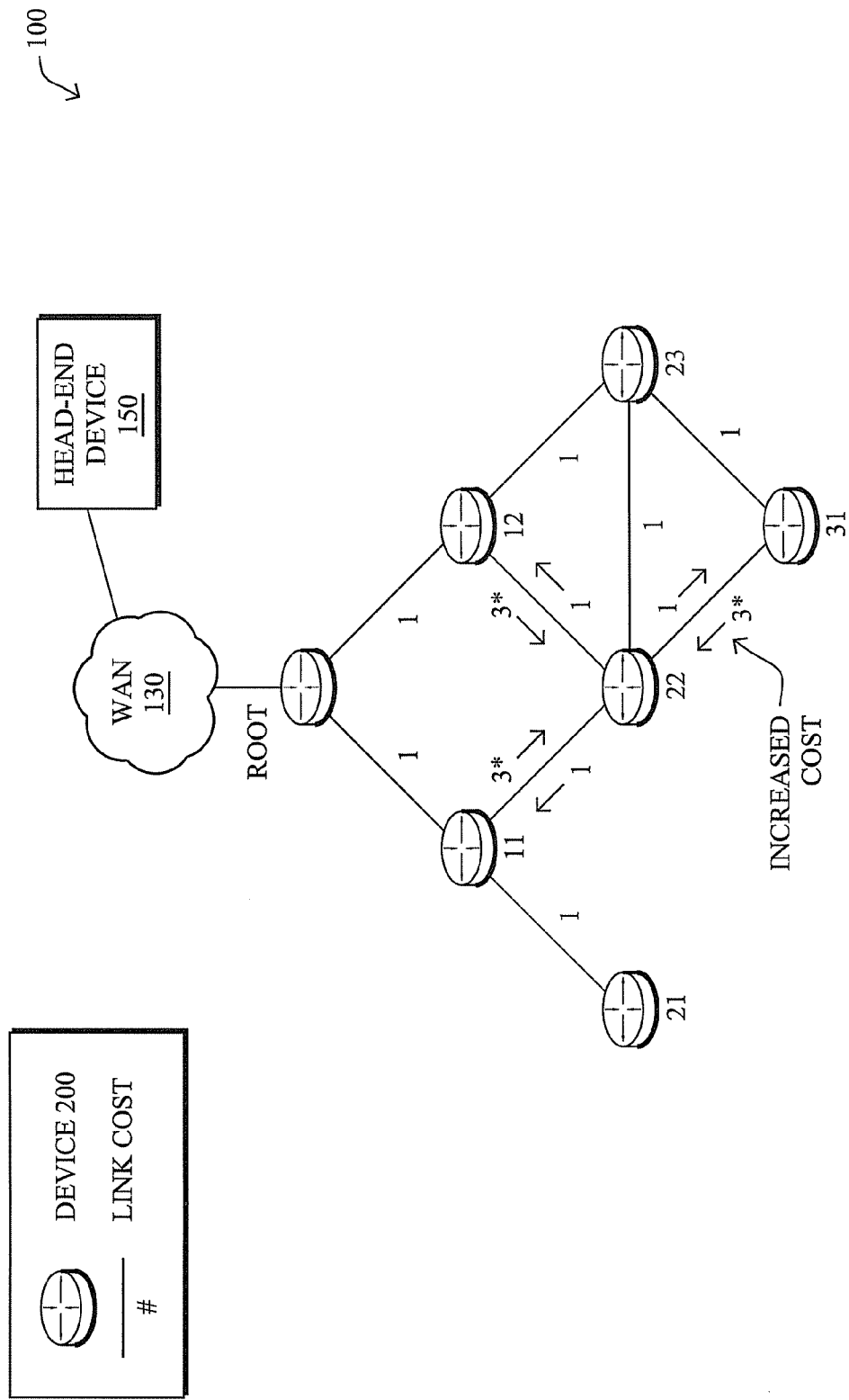
Figure 10C:
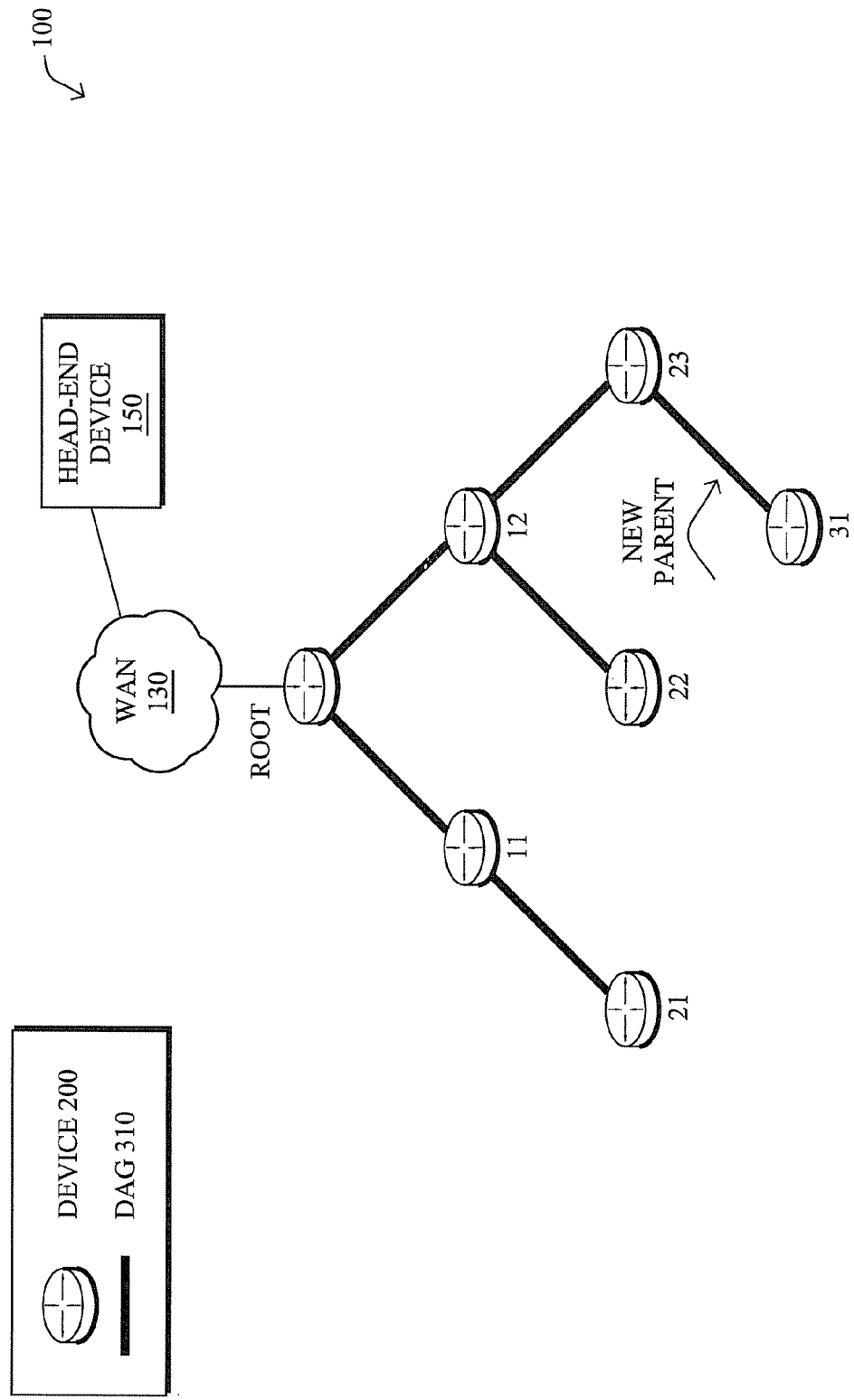

Lastly, FIGS. 10A-10C illustrate an example of the modification of the parameter set p in accordance with the embodiments herein to affect the actual routing costs. For instance, FIG. 10A illustrates an initial set of costs $C_{ij}(p)$ in the network between devices without considering hidden nodes. Note that the cost for node 31 to reach node 22 in FIG. 10A is illustratively a "low" value: 1. In FIG. 10B, however, since node 22 corresponds to a hidden node (node 21 via node 11), assume that the cost is increased to reach node 22 (e.g., proportionately based on a weight value of "2") to a "high" value: 3 (e.g., cost "1" plus weight "2" times one hidden neighbor=3). Accordingly, as shown in FIG. 10C, assuming the illustrative DAG 310 of FIG. 3 above, node 31 may reselect node 23 as its parent node. In this manner, though node 22 and node 21 are still hidden neighbors though node 11, node 22 may experience less traffic as an intermediate node (in fact, in FIG. 10C, it is now a leaf node), and as such, fewer collisions may occur at node 11.

Note that while the cost function adjustment options have been shown individually, it is important to mention that combinations of adjustments may be made to achieve the desired results (i.e., to reduce the impact of hidden nodes, without substantial detriment to routing functionality). For instance, in certain networks it may be better to have a higher transmission power Tx to achieve better link margins, so other parameters, such as channel usage, may be adjusted accordingly. In other networks, it might be unacceptable to have multiple channels, so transmission power may be reduced on certain nodes, while other nodes may reduce their sensitivity, etc. The goal of the algorithm herein is to determine which of the plans (combination of frequencies/channels, transmit power, cost, etc., for each node) gives the desired level of performance.

According to the second illustrative embodiment/algorithm described herein as referenced above, the techniques herein provide a method for optimizing the transmission power of a given node. For instance, as noted, AMI mesh networks are deployed in a variety of environments ranging from very dense neighborhoods where hundreds of nodes compete for a single timeslot to rural areas where the distance between nodes makes it a challenge to provide an adequate uplink path. In an urban area, homes are often situated in proximity to each other and therefore transmission from a single node can be received (and may interfere with) hundreds of other nodes. The number of nodes which can receive the signal from any specific node can be reduced if that node were to reduce its transmission power. On the other hand, by reducing the transmission power, a node may not be able to reach its original parent (the parent that can be reached when the node transmits in full Tx power) and may need to settle for a parent which is farther from the root. On the positive side this would reduce the number of collisions in the network and therefore increase the effective bandwidth of the system. On the negative side, this would increase the delay of the system along the specific path.

A system in accordance with this second illustrative embodiment, therefore, uses the network discovery process to collect the parameters described above, and calculates a tradeoff curve (for each node of interest, e.g., all) between the transmission power and the resulting additional delay as a function of the transmission power of the node. In particular, the head-end application 248 may determine a number of hidden nodes of a particular node across a range of parameters p such as transmission powers and receiver sensitivity, and may also determine a corresponding delay associated with the particular node reaching a root node (or other reference point, such as collectors, head-end nodes, etc.). This delay is based on the fact that the neighbor nodes wirelessly reachable may change according to the respective transmission powers.

Figure 11A:
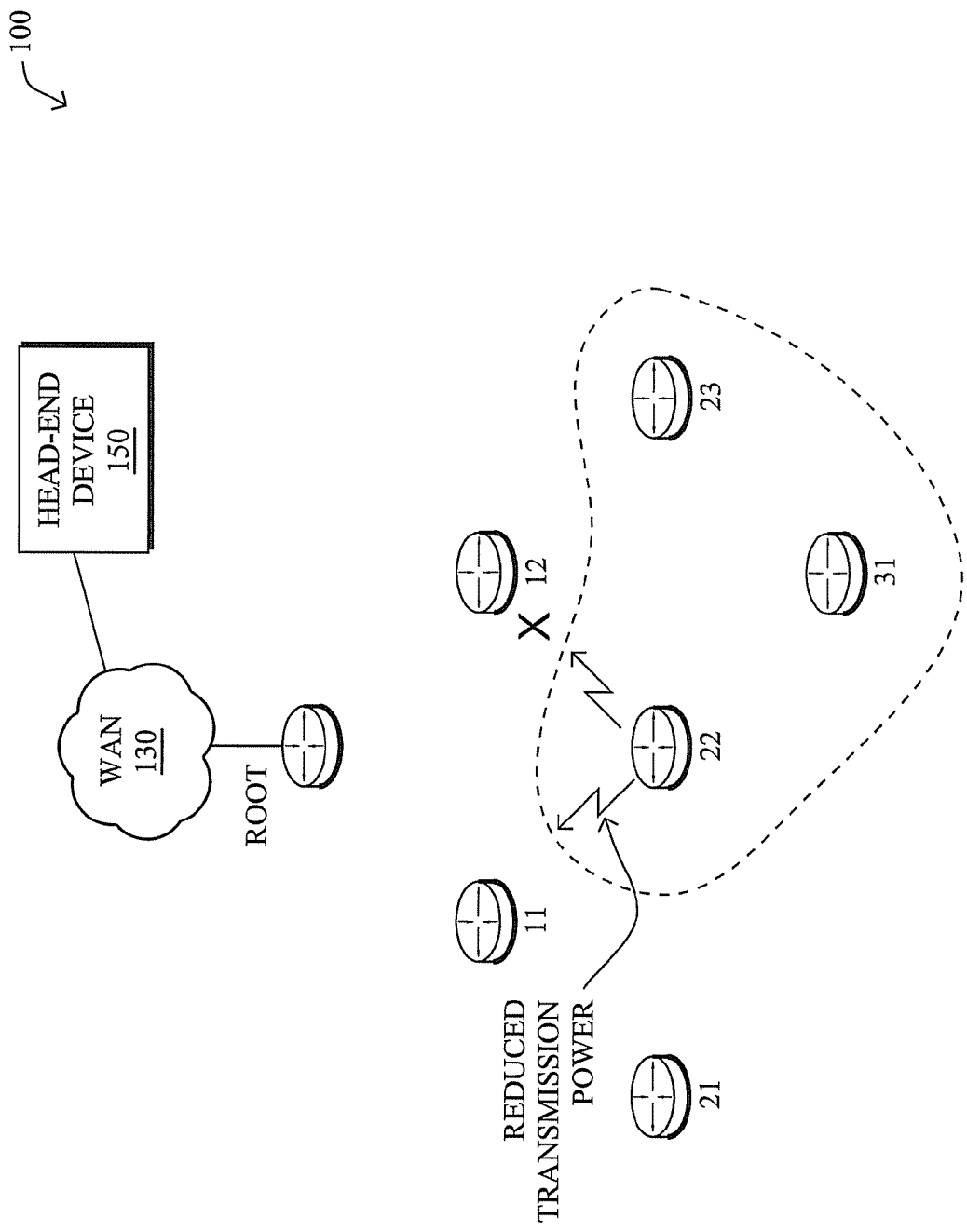
FIG. 11A illustrates another example of reduced transmission power.
Figure 11B:
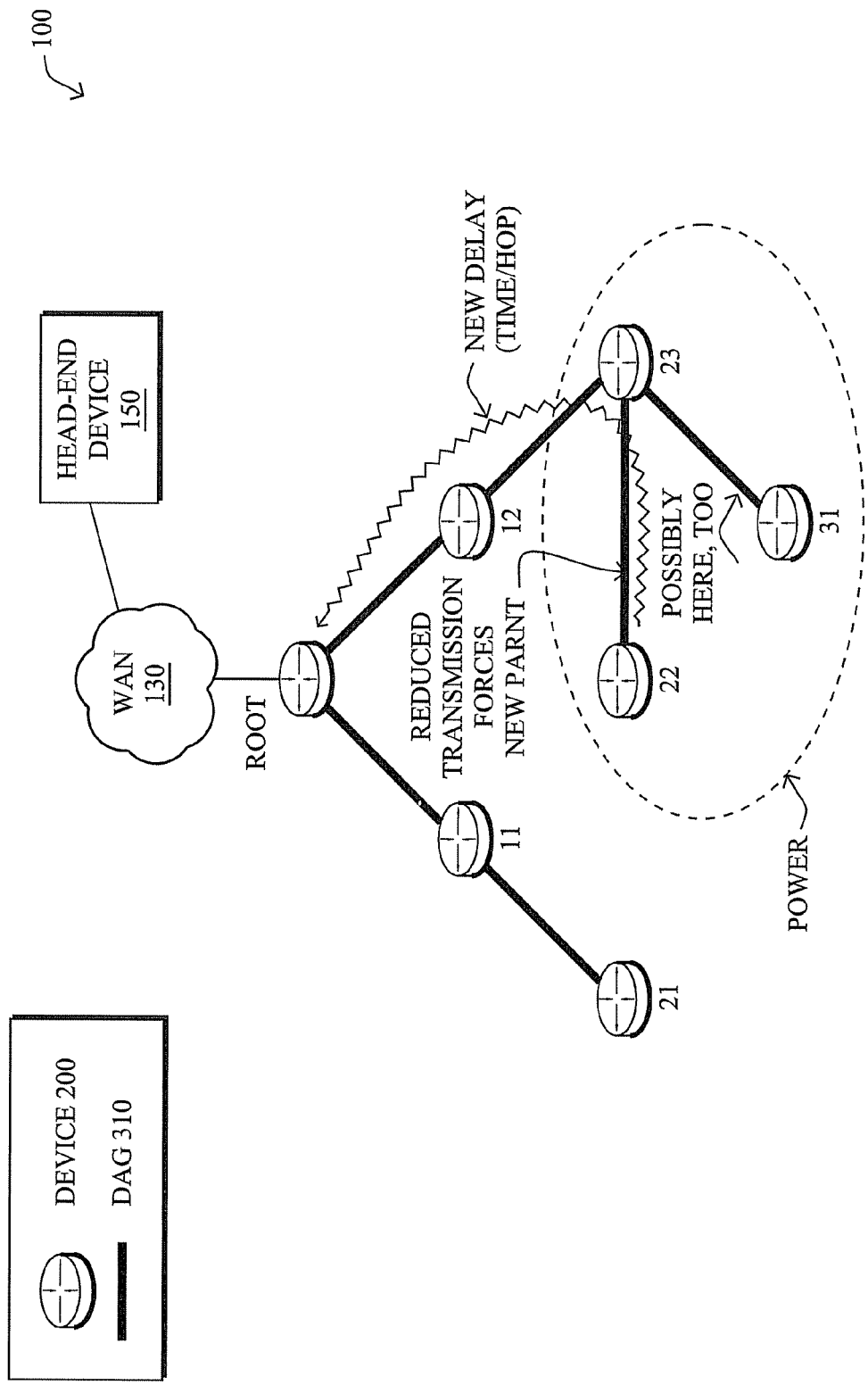
FIG. 11B illustrates an example updated DAG based on reduced transmission power of FIG. 11A.

FIG. 11B illustrates an example updated DAG 310 based on reduced transmission power range for node 22 similar to that as shown in FIG. 11A. Specifically, due to the reduced transmission to avoid collisions at node 11, node 22 may in certain situations (as shown in FIG. 11A) no longer reach its original parent node 12. As such, node 22 must select a new parent node 23 for the DAG 310. Note that even without DAG routing, node 22 is still required to send packets through node 23 to reach the root node and head-end node 150. Additionally, it should be noted that other nodes ay also be affected by the reduced transmission power of node 22, such as node 31, which might elect to select a new parent node 23 as well (e.g., to reduce its hop count to the root node, accordingly).

Figure 12:
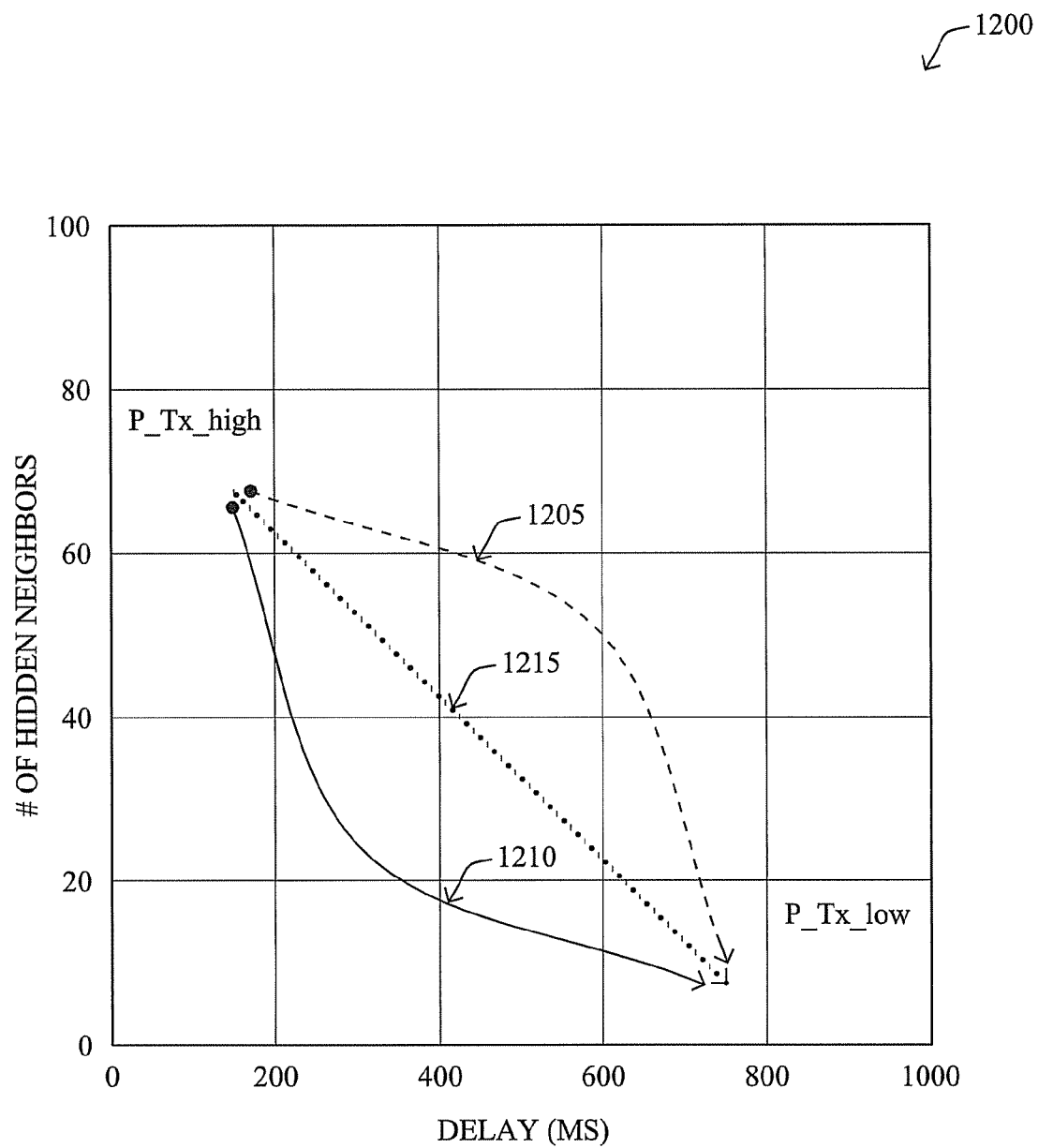
FIG. 12 illustrates an example tradeoff comparison between numbers of hidden neighbors and delay associated with a range of transmission powers.

By scanning through the range of available transmission powers for particular nodes (e.g., node 22), and correspondingly determining i) the number of hidden nodes and ii) the associated delays (e.g., based on time and/or hop count), the head-end application 248 may then correspondingly determine a tradeoff between the number of hidden nodes and the delay. FIG. 12 illustrates an example tradeoff comparison chart 1200 between numbers of hidden neighbors (y-axis) and delay (x-axis) associated with a range of transmission powers ("P_Tx_high" down to "P_Tx_low").

Specifically, the illustrative chart 1200, which is not meant to be limiting or based on any particular network arrangement, depicts three representative cases of network behavior as the node power transmission changes. The top curve 1205 describes a case wherein as the transmission power is reduced, the number of hidden neighbors barely changes at first, but the overall delay increases. Only after the power is cut almost by half and a substantial delay is added to the system does the number of hidden neighbors start going down. Clearly for this node, a reduction of power for reducing the number of hidden neighbors should be done only if the network consideration allows for the increased delay.

The bottom curve 1210 describes a node in which, as the transmission power is reduced, the number of hidden neighbors is drastically reduced, while paying only a minimal delay penalty. Only after the power is cut almost by half and a substantial number of hidden neighbors is eliminated, does the delay of the system start to increase. Clearly for this node a reduction of power for reducing the number of hidden neighbors should be considered up to a certain point as permitted by overall delay considerations.

The middle curve 1215 describes a node wherein the number of hidden neighbors and the delay present a linear tradeoff. It should be noted that for illustration purposes and simplicity, the curves in FIG. 12 were drawn as smooth curves rather than detailed/discrete step functions. Additionally, it should be evident to those skilled in the art that although the above description was illustrated with regards to the transmission power, similar curves can be derived at based on altering the sensitivity of the receiver or based on combination of both the transmitting power and the sensitivity of the receiving node.

For sake of completeness it should also be noted that for all three curves increasing the transmission power beyond a specific high power may increase the number of hidden neighbors. This would increase the contention for transmission media and/or increased number of collisions resulting in increased overall delay and reduced effective network capacity. This portion of the curve is thus not shown in chart 1200 as it is assumed that the system would be configured not to operate in this domain. Similarly, reducing the power below a certain threshold may result in a node not being able to reach any parent and as such an infinite delay. This portion of the curve is of no practical use and as such is also not shown.

A system in accordance with techniques herein may then set the transmission power of a particular node based on an acceptable determined tradeoff. Notably, the techniques may step through the various nodes of the network 100, calculate the tradeoff curves 1200 described in FIG. 12, identify the candidate nodes for the optimization, and alter their set of parameters, such as, for example, to reduce their transmission power accordingly. Said differently, by examining tradeoffs for a plurality of particular nodes, the head-end application 248 may select certain particular nodes (e.g., a subset of all nodes) for which their parameter set, such as for example the transmission power is set to a reduced value based on the certain particular nodes having a best tradeoff. In this instance, it is important to note that the respective transmission power of each node may be set independently of other nodes. In addition, the parameter set, such as for example the transmission power (and other node parameters mentioned herein) may be "set" or "adjusted" by sending configuration messages to the particular nodes, as may be appreciated by those skilled in the art.

Similar to the first embodiment, the second embodiment may also allow a system administrator to configures the $W_{hidden}$ parameter to indicate an acceptable tradeoff between delay (e.g., number of hops) and number of hidden neighbors. For example, if the parameter $W_{hidden}$ is set to be 0.5, the system would be willing to increase the number of hops by one provided that the number of hidden neighbors would be cut by a factor of 2 or more. Note that the tradeoff may be weighted for either the number of hidden nodes or the delay, for instance, depending upon the emphasis desired by the system administrator or by the semantics of the underlying network (e.g., delay sensitive).

In yet another aspect of the techniques herein, rather than maintaining a consistent set of node parameters, e.g., a consistent node-based transmission power, the node parameters may be set on a per-packet basis. In particular, wherein a particular node receives a packet, the packet may be classified as one of either a "low-delay" packet or a "delay-acceptable" packet (or, notably, any desired range in-between). The transmission power for that packet may then be set as a maximum transmission power in response to the packet being a low-delay packet, and, in response to the packet being a delay-acceptable packet, as the selected transmission power that is based on an acceptable determined tradeoff described above.

Figure 13:
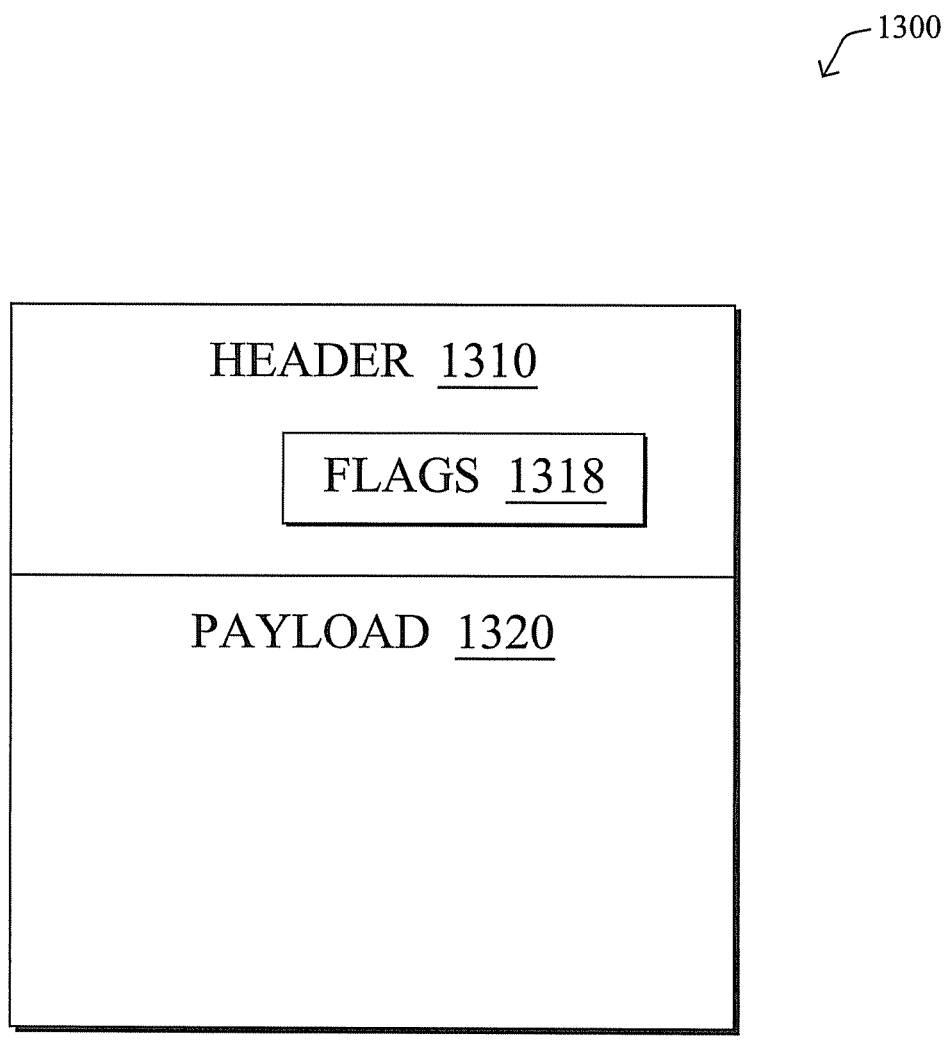
FIG. 13 illustrates an example packet.

The classification as to whether a packet is a low-delay packet or a delay-acceptable packet may be based on a number of factors, such as a type or class of packet, or more explicit indicators, such as marking different packets with a delay tolerance field. For instance, FIG. 13 illustrates an example simplified packet 1300 (e.g., packet 140), comprising a header 1310 and a payload 1320. A flag field 1318 (or other suitable field) may be configured to carry an indication of the packet's classification as either a low-delay packet or a delay-acceptable packet (e.g., an urgency or priority level, or simply an explicit low-delay or delay-acceptable indication). For example, packets such as meter data which can tolerate a longer delay may be transmitted with lower power and therefore introduce lower interferences to hidden neighbors. Packets such as alarms may be marked as urgent and as such can be transmitted with a shorter delay but potentially can interfere with a larger number of other nodes.

Note that in either embodiment above, a network administrator can specify the acceptable delay of packets through the system and allow the system to optimize the transmission power of various nodes in accordance with the network policy. For example the administrator can configure a policy of attempting to have less than 200 hidden neighbors in each cell (for any given node), while ensuring a delay of no more than 250 MS through the network. In this manner, the algorithms described above can use the policy, which may, e.g., define a desired maximum number of hidden nodes per particular node and a maximum allowed delay, to determine whether particular tradeoffs are acceptable.

It should again be pointed out that the two embodiments described above are not mutually exclusive, and may in fact be complimentary or otherwise overlapping. For instance, when adjusting transmission power based on a tradeoff against delay, a routing cost for a set of certain nodes may also be adjusted based on a number of hidden neighbor nodes in the network at correspondingly set transmission powers. In particular, when nodes have a corresponding number of hidden nodes above a configured threshold, the adjusted routing cost may be configured to reduce a likelihood that those certain nodes are selected as intermediate nodes for traffic in the computer network, e.g., as described above with reference to FIGS. 10A-10C.

In the reverse, the node parameters may also be adjusted in combination with the power/delay tradeoff analysis. For example, when determining the cost function as in the first embodiment described above, it may be beneficial to determine the delay associated with a particular node reaching a root node according to certain node parameters of a particular cost function. Accordingly, a tradeoff between the number of hidden neighbors of the particular node and the delay associated with the particular node reaching the root node may be determined, and used to help determine the cost function based on an acceptable tradeoff.

As a further consideration of the embodiments herein, one or more specific embodiments of the system take into account the expected traffic flow amounts (message flows) within the network. Note that the expected traffic flow may be based on current flow over particular links through particular nodes, or may go one step further to simulate the impact of transmissions from nodes on their neighbors based on any expected routing update caused by updated cost functions, node parameters, transmission power, etc. For instance, the computations may factor the number of packets traversing through a specific network segment in the overall time-based delay calculation. Also, if hidden neighbors never communicate with devices in the intersection of their transmission range, time, and channel, then those nodes need not be considered hidden neighbors. In particular, the effect of hidden neighbors in a channel-hopping system is not as prevalent when two different node pairs are communicating, since they often communicate on different channels. However, if those same two nodes are communicating with a single common node, and hence would be on the same hopping schedule, then this is much more of an issue to be addressed by the techniques herein.

Figure 14:
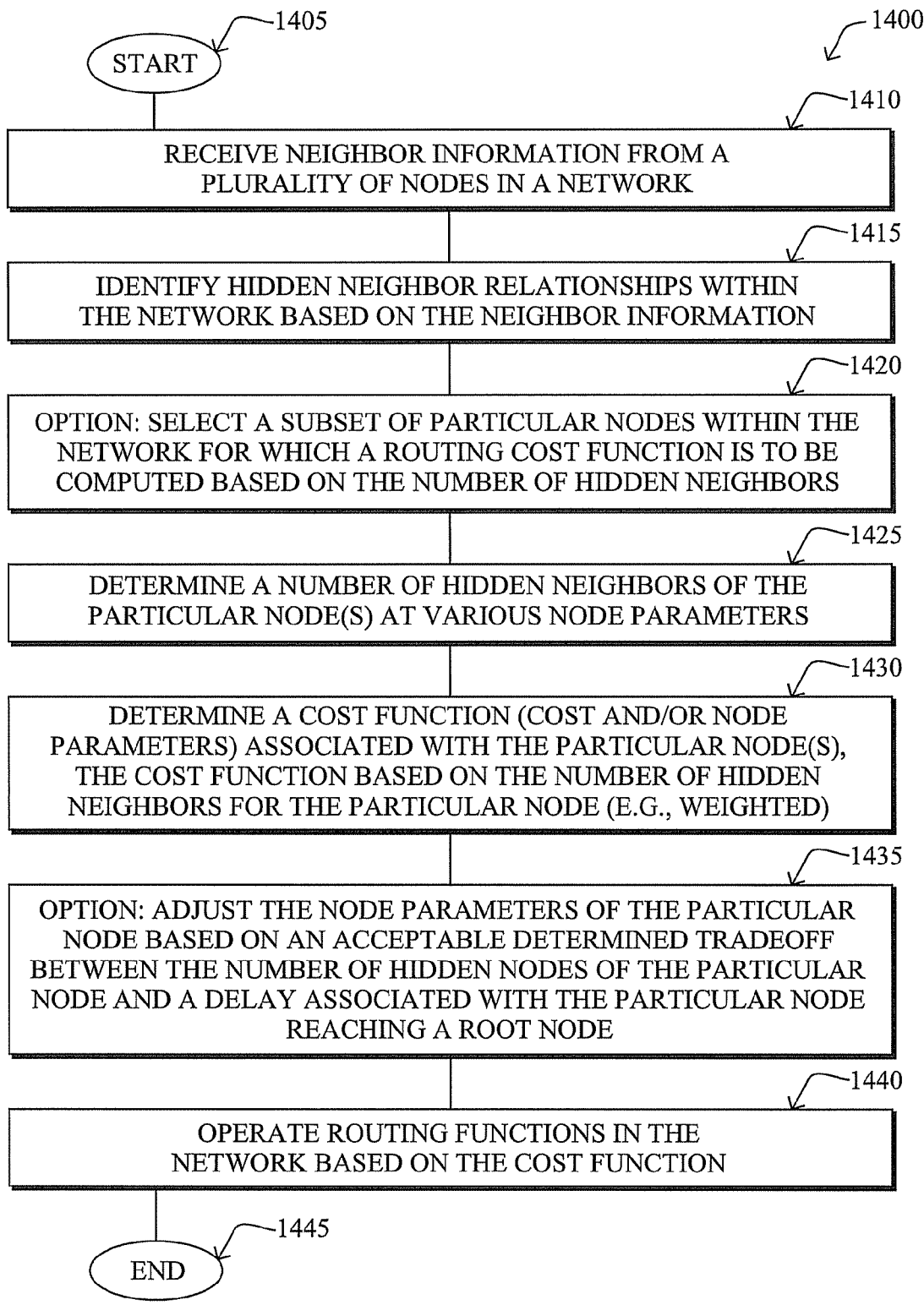
FIG. 14 illustrates an example simplified procedure for reducing the impact of hidden nodes in a wireless network in accordance with one or more embodiments described herein to determine a cost function.

FIG. 14 illustrates an example simplified procedure for reducing the impact of hidden nodes in a wireless network in accordance with one or more embodiments described herein to determine a cost function, e.g., from the perspective of head-end application 248. The procedure 1400 starts at step 1405, and continues to step 1410, where, as described in greater detail above, neighbor information is received from a plurality of nodes in a wireless communication network. From this, in step 1415, hidden neighbor relationships can be identified within the communication network. Optionally, a select subset of particular nodes may be determined in step 1420 for which a cost function is to be calculated based on the number of hidden neighbors, as described above.

By determining, in step 1425, a number of hidden neighbors of the particular node(s) at various node parameters, then in step 1430 a cost function (cost and/or node parameters) associated with the particular node(s) may be determined, where the cost function is specifically based on the number of hidden neighbors for the particular node. As described above, the effect of the hidden neighbors on the cost function may be weighted, such as by an administrative policy. Optionally, the node parameters of the particular node(s) may also be adjusted in step 1435 based on an acceptable determined tradeoff between the number of hidden nodes of the particular node and a delay associated with the particular node reaching a root node at those node parameters. In step 1440, routing functions (e.g., advertising, routing packets, etc.) may operate in the computer network based on the cost function. The procedure 1400 ends in step 1445, notably with the option of restarting in response to topology updates, policy changes, traffic flow demands, etc.

Figure 15:
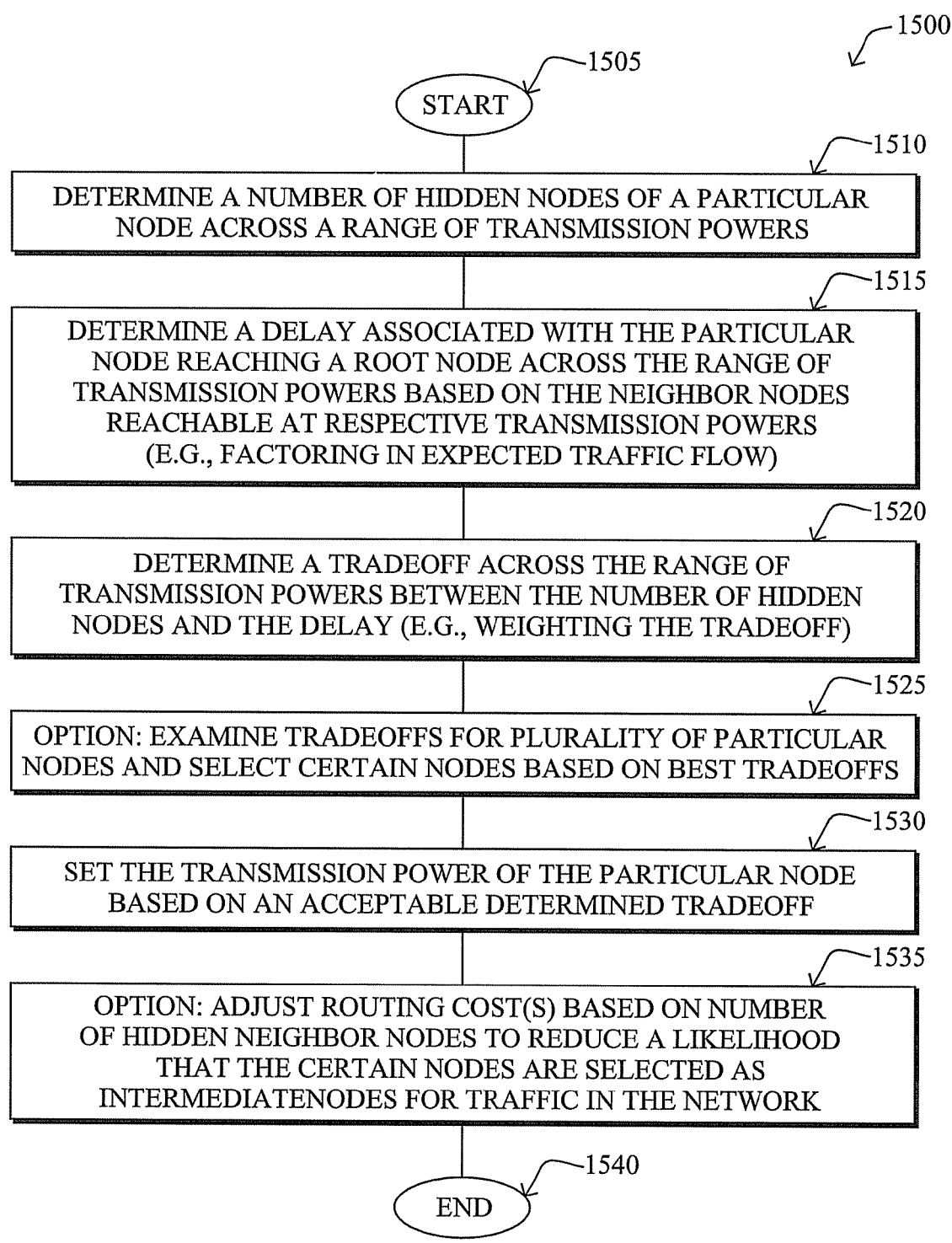
FIG. 15 illustrates another example simplified procedure for reducing the impact of hidden nodes in a wireless network in accordance with one or more embodiments described herein to balance transmission power and delay.

In addition, FIG. 15 illustrates another example simplified procedure for reducing the impact of hidden nodes in a wireless network in accordance with one or more embodiments described herein to balance transmission power and delay, e.g., from the perspective of head-end application 248. The procedure 1500 starts at step 1505, and continues to step 1510, where, as described in greater detail above, a number of hidden nodes of a particular node (e.g., node 22) is determined across a range of transmission powers. In addition in step 1515, a delay associated with the particular node reaching a root node across the range of transmission powers may also be determined based on the neighbor nodes reachable at respective transmission powers (e.g., factoring in expected traffic flow as noted above).

In step 1520, the head-end application 248 determines a tradeoff across the range of transmission powers between the number of hidden nodes and the delay (e.g., weighting the tradeoff, noted above). In one embodiment, in step 1525, the tradeoffs for a plurality of particular nodes can be examined in order to select certain nodes based on best tradeoffs. In step 1530, for one particular node or a plurality, the transmission power is set based on an acceptable determined tradeoff (e.g., reduced), as described in detail above. As also described above, in step 1535 routing cost(s) to nodes may be adjusted based on a number of hidden neighbor nodes to reduce a likelihood that the certain nodes are selected as intermediate nodes for traffic in the computer network, e.g., where transmission power cannot be reduced effectively. The procedure 1500 ends in step 1540, notably with the option of restarting in response to topology updates, policy changes, traffic flow demands, etc.

Figure 16:
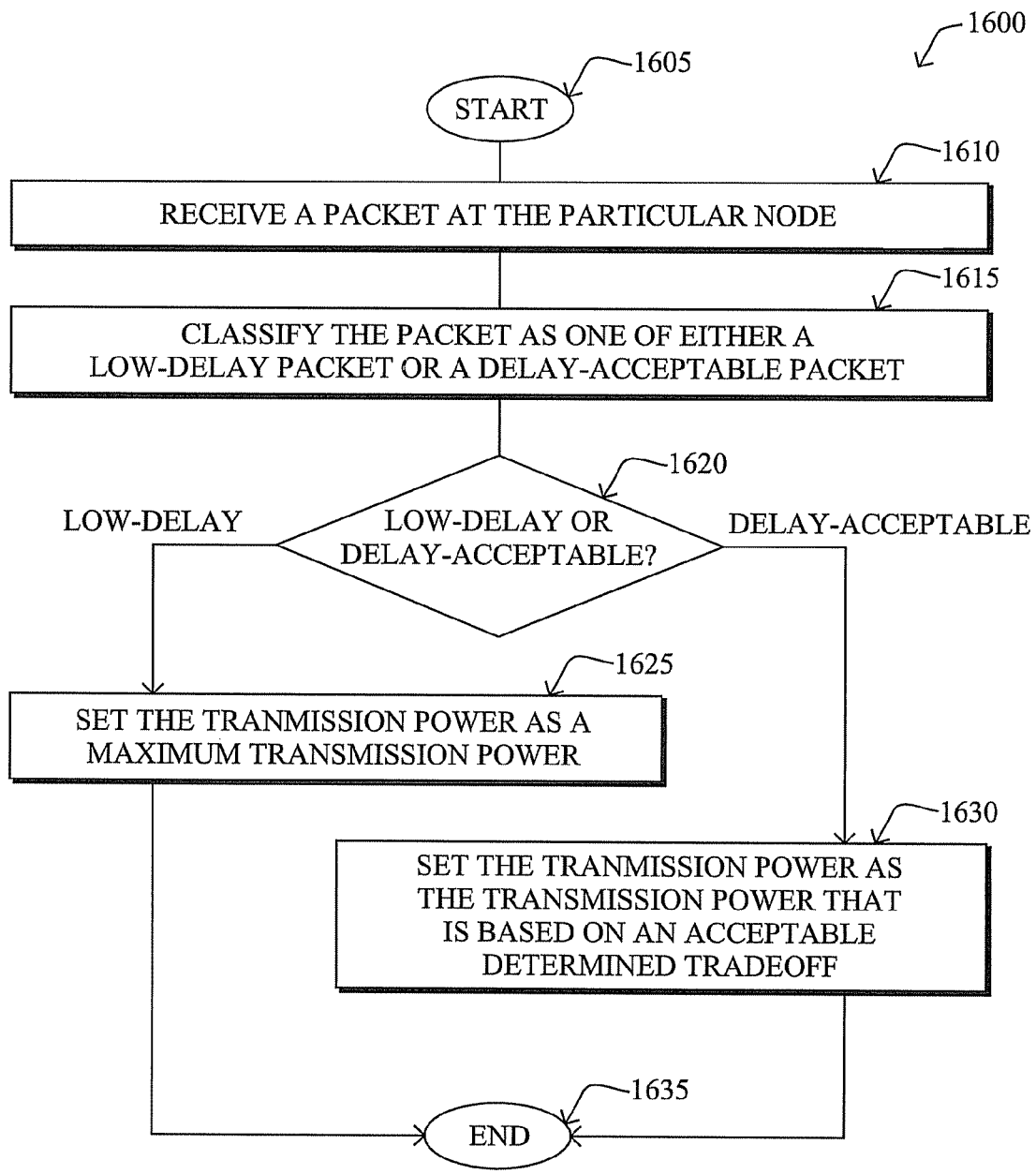
FIG. 16 illustrates an example simplified procedure for reducing the impact of hidden nodes in a mesh network from the perspective of a receiving node.

Also, as noted above, the transmission power may be adjusted on a per-packet basis. Accordingly, FIG. 16 illustrates an example simplified procedure for reducing the impact of hidden nodes in a wireless network from the perspective of a receiving node (e.g., node 22). The procedure 1600 starts at step 1605, and continues to step 1610, where, as described in greater detail above, a particular node (e.g., node 22) receives a packet 140/1300. In response, the packet can be classified in step 1615 as one of either a low-delay packet or a delay-acceptable packet, such as based on the type or class of packet, or based on explicit flags 1318, etc. If in step 1620 the packet is identified as a low-delay packet, then in step 1625 the transmission power for that packet is set as a maximum (or at least increased) transmission power, while if in step 1620 the packet is identified as a delay-acceptable packet, then in step 1630 the transmission power is set as the transmission power that is based on an acceptable determined tradeoff (e.g., reduced). The procedure 1600 ends in step 1635, until another packet is received at the device/node.

It should be noted that while certain steps within procedures 1400-1600 may be optional as described above, the steps shown in FIGS. 14-16 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1400-1600 are described separately, certain steps from each procedure may be incorporated into each other procedure, and the two procedures are not meant to be mutually exclusive.

The novel techniques described herein thus reduce the impact of hidden nodes in a network. In particular, by applying the techniques herein, the resulting system has a greatly reduced collision rate compared with current systems, and therefore improves network efficiency (effective bandwidth) by reducing the number of packets that need to be retransmitted. Specifically, as described above, the techniques optimally route packets to reduce the hidden node contention/collision in a wireless mesh system, and also (or alternatively) transmit packets based on the tradeoff between the number of hidden neighbors and the network delay as a function of the transmission power of the given node. The techniques herein also proactively utilize easy-to-collect parameters and reflect the realistic cost of transmitting packets to a given node in a network as the techniques take into account the physical parameters of the environment and the impact of potential collisions with packets from hidden nodes.

Another benefit of the techniques herein is the fact that the additional network control messages can be sent at the lowest priority and during a time when network bandwidth is available. The optimization is thus paid back during periods of high message flow (e.g., demand responses, power restoration, etc.), by reducing collisions and the need to retransmit when free bandwidth is limited. Also, ongoing network optimization (cost or transmission power adjustments) may be suspended at that time, as well.

Also, as noted, the techniques herein take into account the specific parameters of a given network and provide optimization for a specific network/environment. While current systems assume a uniform node distribution, the techniques herein examine the topology of the network and assesses the number of nodes within the interference range based on actual/measured signal strength and the actual network topology with its o generally semi-random node distribution. Also, current systems often assume that all nodes transmit with the same power, though conversely the techniques herein optimize the specific power of each node (or for each packet). Moreover, the techniques herein do not assume uniform transmission patterns, but rather take into account the fact that nodes closer to the root node often handle more traffic than leaf nodes, and also do not assume any synchronization or a predefined scheduling scheme amongst the various nodes in the mesh network.

While there have been shown and described illustrative embodiments that reduce the impact of hidden nodes in a wireless network, it is to be understood that various other adaptations and modifications may be made within the spirit and scope of the embodiments herein. For example, the embodiments have been shown and described herein with relation to wireless networks, such as LLNs. However, the embodiments in their broader sense are not as limited, and may, in fact, be used with other types of networks and/or protocols where only certain nodes within the network communicate wirelessly. Further, while particular wireless protocols may have been mentioned above, it should be understood that such protocols are merely examples, and are not meant to limit the scope of the embodiments herein. Moreover, while the techniques describe reaching a root node of a DAG, the "root node" to which delay is measured may include other types of management/collector nodes, and need not be an actual DAG root. In particular, while the use of DAGs are shown and described, it should be noted that the embodiments herein are not limited to DAG-based routing networks, and the use of DAGs is merely an example routing topology.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving neighbor information from a plurality of nodes in a communication network;
   identifying hidden neighbor relationships within the communication network based on the neighbor information;
   determining a number of hidden neighbors for a particular node of the plurality of nodes at various node parameters, wherein a hidden neighbor is hidden from the particular node due to the hidden neighbor being out of communication range with the particular node; and determining a cost function associated with the particular node, the cost function based on the number of hidden neighbors for the particular node, wherein routing functions operate in the communication network based on the cost function.

2. The method as in claim 1, wherein determining the cost function comprises:

selecting a set of node parameters based on the number of hidden nodes of the particular node to minimize interference between hidden neighbors.

3. The method as in claim 1, wherein the node parameters comprise transmission power, transmission channel, and receiver sensitivity.

4. The method as in claim 1, wherein determining the cost function comprises:

selecting a route cost based on the number of hidden nodes of the particular node to minimize interference between hidden neighbors, wherein the route cost is increased with regard to increased numbers of hidden nodes.

5. The method as in claim 1, wherein determining the cost function comprises:

applying a weight to the number of hidden nodes when determining the cost function.

6. The method as in claim 1, wherein determining the cost function comprises:

determining a delay associated with the particular node reaching a root node in the computer network according to node parameters of a particular cost function;

determining a tradeoff between the number of hidden neighbors of the particular node and the delay associated with the particular node reaching the root node; and determining the cost function based on an acceptable determined tradeoff.

7. The method as in claim 1, further comprising:

selecting a subset of particular nodes within the computer network for which a cost function is based on the number of hidden neighbors.

8. A method, comprising:

determining a number of hidden nodes of a particular node across a range of transmission powers in a computer network, the hidden nodes able to reach neighbor nodes of the particular node, the particular node able to reach the neighbor nodes but not the hidden nodes at the respective transmission power, wherein a hidden node is hidden from the particular node due to the hidden node being out of communication range with the particular node;

determining a delay associated with the particular node reaching a root node in the computer network across the range of transmission powers based on the neighbor nodes reachable at respective transmission powers;

determining a tradeoff across the range of transmission powers between the number of hidden nodes of the particular node and the delay associated with the particular node reaching the root node; and setting the transmission power of the particular node based on an acceptable determined tradeoff.

9. The method as in claim 8, further comprising:

examining tradeoffs for a plurality of particular nodes;

selecting certain particular nodes of the plurality of particular nodes for which the transmission power is set to a reduced value based on the certain particular nodes having a best tradeoff.

10. The method as in claim 9, wherein setting comprises:

setting a respective transmission power of each certain particular node independently of other certain particular nodes.

11. The method as in claim 8, further comprising:

determining whether tradeoffs are acceptable based on a policy defining a desired maximum number of hidden nodes per particular node and a maximum allowed delay.

12. The method as in claim 8, wherein determining the delay comprises:

basing the delay on expected traffic flow between the particular node and the root node.

13. The method as in claim 8, further comprising:

receiving a packet at the particular node;

classifying the packet as one of either a low-delay packet or a delay-acceptable packet;

setting the transmission power as a first transmission power in response to the packet being a low-delay packet; and setting the transmission power as the transmission power that is based on an acceptable determined tradeoff in response to the packet being a delay-acceptable packet, the transmission power that is based on an acceptable determined tradeoff in response to the packet being a delay-acceptable packet being lower than the first transmission power.

14. The method as in claim 13, wherein the packet carries an indication of its classification as either a low-delay packet or a delay-acceptable packet.

15. The method as in claim 8, wherein determining the tradeoff comprises:

weighting the tradeoff for one of either the number of hidden nodes of the particular node or the delay associated with the particular node reaching the root node.

16. The method as in claim 8, further comprising:

adjusting a routing cost for a set of certain nodes in the computer network based on a number of hidden neighbor nodes of a set of particular nodes at correspondingly set transmission powers, wherein each node of the set of certain nodes has a corresponding number of hidden nodes above a configured threshold, the adjusted routing cost configured to reduce a likelihood that the certain nodes are selected as intermediate nodes for traffic in the computer network.

17. A tangible, non-transitory, computer-readable media having software encoded thereon, the software when executed by a processor operable to:

receive neighbor information from a plurality of nodes in a communication network;

identify hidden neighbor relationships within the communication network based on the neighbor information;

determine a number of hidden neighbors for a particular node of the plurality of nodes at various node parameters, wherein a hidden neighbor is hidden from the particular node due to the hidden neighbor being out of communication range with the particular node; and determine a cost function associated with the particular node, the cost function based on the number of hidden neighbors for the particular node, wherein routing functions operate in the communication network based on the cost function.

18. The computer-readable media as in claim 17, wherein the software when executed to determine the cost function is further operable to:
- select a set of node parameters based on the number of hidden nodes of the particular node to minimize interference between hidden neighbors; and
- select a route cost based on the number of hidden nodes of the particular node to minimize interference between hidden neighbors, wherein the route cost is increased with regard to increased numbers of hidden nodes.

19. A tangible, non-transitory, computer-readable media having software encoded thereon, the software when executed by a processor operable to:
- determine a number of hidden nodes of a particular node across a range of transmission powers in a computer network, the hidden nodes able to reach neighbor nodes of the particular node, the particular node able to reach the neighbor nodes but not the hidden nodes at the respective transmission power, wherein a hidden node is hidden from the particular node due to the hidden node being out of communication range with the particular node;
- determine a delay associated with the particular node reaching a root node in the computer network across the range of transmission powers based on the neighbor nodes reachable at respective transmission powers;
- determine a tradeoff across the range of transmission powers between the number of hidden nodes of the particular node and the delay associated with the particular node reaching the root node; and
- set the transmission power of the particular node based on an acceptable determined tradeoff.

20. The computer-readable media as in claim 19, wherein the software when executed is further operable to:
- examine tradeoffs for a plurality of particular nodes;
- select certain particular nodes of the plurality of particular nodes for which the transmission power is set to a reduced value based on the certain particular nodes having a best tradeoff.

21. The computer-readable media as in claim 19, wherein the particular node is configured to classify the packet as one of either a low-delay packet or a delay-acceptable packet, and to set the transmission power as a maximum transmission power in response to the packet being a low-delay packet and set the transmission power as the transmission power that is based on an acceptable determined tradeoff in response to the packet being a delay-acceptable packet.

22. The computer-readable media as in claim 19, wherein the software when executed to determine the tradeoff is further operable to:
- weight the tradeoff for one of either the number of hidden nodes of the particular node or the delay associated with the particular node reaching the root node.

23. The computer-readable media as in claim 19, wherein the software when executed is further operable to:
- adjust a routing cost for a set of certain nodes in the computer network based on a number of hidden neighbor nodes of a set of particular nodes at correspondingly set transmission powers, wherein each node of the set of certain nodes has a corresponding number of hidden nodes above a configured threshold, the adjusted routing cost configured to reduce a likelihood that the certain nodes are selected as intermediate nodes for traffic in the computer network.

* * * * *

UNITED STATES PATENT AND TRADEMARK OFFICE
CERTIFICATE OF CORRECTION

Page 1 of 1

PATENT NO.        : 9,019,846 B2
APPLICATION NO.   : 13/164731
DATED             : April 28, 2015
INVENTOR(S)       : Shaffer et al.

It is certified that error appears in the above-identified patent and that said Letters Patent is hereby corrected as shown below:

In the Specification

In column 13, line 44, please replace:
"ay" with "may"

In column 14, line 57, please replace:
"configures" with "configure"

Please amend column 18, line 13 as follows:
ogy with its generally semi-random node distribution. Also, Signed and Sealed this
Eighteenth Day of August, 2015

Michelle K. Lee
*Director of the United States Patent and Trademark Office*